Oct. 10, 1972    D. S. BLAISDELL ET AL    3,697,420
METHOD AND APPARATUS FOR TREATMENT OF AQUEOUS LIQUOR
Original Filed June 9, 1964                    5 Sheets-Sheet 1

INVENTORS

Oct. 10, 1972  D. S. BLAISDELL ET AL  3,697,420
METHOD AND APPARATUS FOR TREATMENT OF AQUEOUS LIQUOR
Original Filed June 9, 1964  5 Sheets-Sheet 4

3,697,420
Patented Oct. 10, 1972

3,697,420
METHOD AND APPARATUS FOR TREATMENT OF AQUEOUS LIQUOR
Donald Stapf Blaisdell, 780 Summit Ave., St. Paul, Minn. 55105, and Ruth Elizabeth Barry Klaas, 3531 Ridgewood Road, Arden Hills, Minn.
Continuation of application Ser. No. 373,701, June 9, 1964, now abandoned, which is a continuation-in-part of application Ser. No. 206,184, June 29, 1962, now Patent No. 3,142,638, which in turn is a continuation-in-part of applications Ser. No. 724,785, Mar. 31, 1958, and Ser. No. 786,906, Jan. 15, 1959, both abandoned. This application Mar. 19, 1968, Ser. No. 714,362
Int. Cl. B01d 35/06; B03c 1/10
U.S. Cl. 210—42                       8 Claims

ABSTRACT OF THE DISCLOSURE

Sewage treatment methods and apparatus are disclosed including those relating to catalytic oxidation, digestion under the influence of magnetic fields, the use of weighting agents which, preferably, are magnetically susceptible, and magnetic densification. Magnetic densification is achieved by adding cationic polyelectrolytic coagulants and magnetic weighting agents to sewage and densifying the coagulated solids under the influence of a magnetic field which may be either uniform or nonuniform, thus producing a clarified effluent.

---

This application is a continuation of copending application Ser. No. 373,701, filed June 9, 1964, now abandoned, which is a continuation-in-part of our copending application Ser. No. 206,184, filed June 29, 1962, now U.S. Pat. 3,142,638, which in turn is a continuation-in-part of our copending applications Ser. No. 786,906, filed Jan. 15, 1959, and Ser. No. 724,785, filed Mar. 31, 1958, both of which are now abandoned.

This invention relates to the treatment of aqueous liquor, especially sewage. More specifically, this invention relates to novel sewage-treating apparatus and processes especially adapted for the chemical treatment of sewage.

It is a principal object of this invention to provide apparatus and processes for separating solids from sewage and for reducing the biochemical oxygen demand of said sewage, by treatment of said sewage with certain chemical compositions, said compositions generally, but not necessarily, containing iron ore weighting agent, generally in conjunction with novel sewage-treating processes incorporating, in greatly improved form, certain features of plain sedimentation and/or activated-sludge and/or biological filtration sewage-treating apparatus and processes.

Another object of this invention is to provide a novel magnetic agglomerating apparatus adopted to form rapidly large weighted floccules in a process stream consisting of sewage and dispersed chemical composition comprising iron ore weighting agent and/or other magnetically susceptible material.

It is a further object of this invention to provide apparatus for accelerating the biochemical decomposition of certain sewage compositions under the influence of a magnetic field.

It is a further object of this invention to provide apparatus for feeding nutrients into, and thereby accelerating, the biochemical decomposition of sewage compositions in such biological processes as the activated-sludge and the biological oxidation filtration processes.

Still a further object of this invention is to provide apparatus for the aeration, in the presence of oxidation catalyst, of sewage liquor and/or chemically treated and settled sewage liquor.

Another object of this invention is to provide apparatus for the removal of soluble oxidation catalyst from chemically treated, settled, and catalytically oxidized sewage liquor.

Various other objects, advantages, and features of this invention will become apparent to those skilled in the art upon reading the specification and appended claims. One of the broadest fields of utility for our invention is, of course, the treatment of municipal sewage, industrial wastes, or combinations thereof.

Sewage ordinarily is a dilute aqueous mixture of wastes from household and industry that it is convenient and economical to carry away by water. As used in this specification and the appended claims, the term "sewage" refers to any of the ordinary types of aqueous liquors containing significant amounts of wastes, such as fecal matter, domestic wastes, and such like, and is not to be construed as being limited by meaning only aqueous liquors which in lay terms are ordinarily called sewages, nor should it be construed as being limited to mean aqueous liquors which have actually been carried through pipe, conduit, or sewers. In some embodiments of our invention, the concentrations of wastes of significance to the application at hand may be only a few parts per million, and in other embodiments the concentrations may be as high as 10,000 parts per million or even higher. Unless otherwise defined in this specification, the definitions of the terms and tests we use are those set forth in the book, "Standard Methods for the Examination of Water, Sewage, and Industrial Wastes," 10th edition, published in 1955 by the American Public Health Association of New York city, in such standard chemistry books as Lange, "Handbook of Chemistry," Handbook Publishers, Inc., Sandusky, Ohio, 1944, and in such standard sewage texts as Babbitt and Bauman, "Sewerage and Sewage Treatment," 8th edition, New York, John Wiley & Sons, Inc., 1958.

In application for U.S. Letters Pat. Ser. No. 206,184, filed June 29, 1962, the present inventors disclose in detail novel additives for sewage, and novel methods of treating sewage by means of chemical compositions including a type of organic polymer, weighting agent and (optionally) water-dispersible inorganic cationic flocculant aid (e.g., ferric hydroxide and/or aluminum hydroxide). As pointed out in that application, iron ore weighting agent having a particle size less than 50 mesh (U.S. Standard Screens), generally speaking, of an average particle size in the range of 50 mesh to 200 mesh (U.S. Standard Screens) has been found to coact in synergistic fashion to a most remarkable extent with the water-dispersible synthetic organic cationic polyelectrolytic flocculating material.

The type of process applicable to insure rapid removal of flocs—gravity, magnetic field, electrostatic field, centrifugation, or such like—will in each case of course be determined chiefly by the properties of the specific weighting agent and/or organic polyelectrolytic flocculant employed, and generally to a lesser degree by the nature of the suspended solids in the sewage. Weighting material should be of fairly large particle size—e.g. in the range of 50 to 100 mesh (U.S. Standard Screens) when gravity only is used for sedimentation, but may be of much smaller particle size when magnetic, filtration, centrifugal, or such like method of separation is employed. However, weighting material of very large particle size—as large as 10 mesh (U.S. Standard Screens)—has been used satisfactorily in up-flow processes employing a "fluidized-bed" technique of the type hereinafter described. Magnetite of about 325 mesh (U.S. Standard Screens) is readily available in commercial quantities (from Lake Superior taconite operations), and is particularly suitable for processes involving magnetic agglomeration and/or magnetic separation. Additionally there may also be added to the sewage along with the other classes of treating materials described above essentially non-ionic absorbents having high surface area per unit volume—such as activated carbon. The classes of treating materials may be combined in various ways, as will be described further herein, to make compositions of matter useful as additives for sewage, industrial wastes, raw water, and the like, especially if there is added separately to the sewage or raw water, in addition to the composition comprising water-dispersible synthetic organic cationic polyelectrolytic flocculating material and iron ore, flocculating material of an electrical charge opposite to that of the water-dispersible synthetic organic polyelectrolyte employed.

We have discovered that the most generally applicable additives for sewage, in the practice of our invention, contain from about 1 to about 100 parts of synthetic organic cationic polyelectrolytic flocculating material and from about 1 to about 100 parts by weight of weighting material and also may contain from about 1 to about 100 parts of inorganic polyelectrolytic flocculant aid and/or from about 1 to about 100 parts by weight of substantially non-ionic absorbent material.

For economic as well as technical reasons, iron ore has been found to be outstanding as a weighting agent. In some cases—especially those in which catalytic effects are desired from the presence of the weighting agent, as in oxidation of the sewage/sewage additive composition by blowing air through same or the clarified liquor obtained therefrom—other weighting agents, generally selected from the substantially water-insoluble compounds (preferably oxides in the case of metals where the oxide employed can be selected to be substantially water-insoluble and non-reactive with water) of metals which form coordinate covalent bonds with amines (e.g., mercury, copper, platinum, cobalt, nickel, silver, thallium) or with ammonia (e.g., cobalt, chromium, platinum, copper, silver, zinc, rhodium, mercury, nickel, gold, osmium, aluminum, thallium) may be admixed with the iron ore in such fashion as to form weighting agent, or in some cases may be used alone or in combination with each other as weighting agents. In general, therefore, weighting agents useful in the practice of this invention are finely ground solids, substantially insoluble in water, having little or no tendency to degrade spontaneously in particle size to particles of colloidal dimensions in water, and having a specific gravity substantially in excess of 1, and preferably above 3. We have found such materials as iron-containing barite, magnetite, hematite, franklinite, iron-containing zirconia, and ilmenite, of an average particle size in the range of 50 mesh to 200 mesh (U.S. Standard Screens) particularly effective. Water-sensitive iron ore materials such as even those clays which contain enough iron to have a yellow or reddish color, which tend to form colloidal stable suspensions in water, are specifically excluded. Likewise it frequently may be desirable to include in the sol of water-dispersible inorganic cationic flocculant aid (generally, of ferric hydroxide or aluminum hydroxide—see Bayles and Mills, "Basic Chemistry for High Schools," The Macmillan Co., New York, 1947, page 131; Latimer and Hildebrand, "Reference Book of Inorganic Chemistry," Revised edition, The Macmillan Co., New York, 1940, page 393; Hildebrand, "Principles of Chemistry," Fifth edition, The Macmillan Co., New York, 1947, pages 355 to 373; McCutcheon, Seltz and Warner, "General Chemistry," D. Van Nostrand Co., Inc., New York, 1939, page 335; Rollinson, "Olation and Related Chemical Processes" in "The Chemistry of the Coordination Compounds," as edited by Bailar, Reinhold Publishing Corp., New York, 1956, pages 448 to 471)—if such is used— at least some ions of metals selected from the group consisting of cobalt, chromium, platinum, copper, silver, zinc, rhodium, mercury, nickel, gold, osmium, aluminum, and thallium. The type of metal(s) and/or metal compound(s) most useful for catalytic purposes in the oxidation of sewage of course varies with the type of solids in the sewage, but almost invariably will be selected from the group consisting of iron, cobalt, manganese, osmium, silver, copper, tin, vanadium, cerium, titanium, platinum, nickel, uranium, chromium, mercury, molybdenum, aluminum, tungsten, selenium, palladium, and lead—but perhaps most frequently copper or cobalt or both will be selected; in instances where it is impractical to include the catalytically active metal(s), metal compound(s) or both in the weighting agent or water-dispersible inorganic cationic flocculant aid or both, it will usually be possible to include such catalytically active material as a component of the sewage-treating equipment—for example, as a metal mesh screen or as a metal or metal oxide-bead bed in the air oxidation chamber of the sewage-treating equipment. As noted above, we have found compounds of copper and cobalt especially useful oxidation catalysts in the aeration of sewage; copper itself, in the form of metal mesh screening, also serves well as a catalyst in air oxidation procedures. (See "The Chemistry of the Coordination Compounds," edited by J. C. Bailar, Jr., New York, Reinhold Publishing Corp., 1956, especially front inside cover, front cover page, pages 1 through 99 and 416 through 471; also, Hildebrand, "Principles of Chemistry," Fifth edition, New York, The Macmillan Co., 1947, pages 82 through 104 and 146 through 152, and Latimer and Hildebrand, "Reference Book of Inorganic Chemistry," Revised edition, New York, The Macmillan Company, 1940, especially pages 98 to 100.)

Substantially non-ionic absorbent material of fine particle size (generally speaking, in the range of 50 to 200 mesh, U.S. Standard Screens) and having a surface area of at least 10 square meters per gram of material may be used in combination with synthetic organic polyelectrolytic flocculating material and weighting materials and (optionally) also polyelectrolytic flocculant aids in the compositions of matter and processes described herein. In applications of this kind, we have found various grades of activated charcoal and the like materials effective.

Water-dispersible synthetic organic cationic polyelectrolytic flocculating materials most useful in the practice of this invention include water-dispersible types containing primary amine, secondary amine, tertiary amine, quatarnary amine groups, or combinations thereof. Generally speaking, the most effective types of polyelectrolytes have average molecular weights in excess of about 10,000. We have found water-dispersible polymerized ethylene imine and derivatives thereof obtained by reacting said polymerized ethylene imine with aqueous hydrochloric acid and with various amounts of ethyl bromide or aqueous ethyl alcohol and like derivatives to be especially effective in the treatment of sewage and the like. In addition, we have found that water-dispersible melamine-formaldehyde resins, urea-formaldehyde resins, and the like, and compositions obtained by heating said resins with various amounts of an amine such as pyridine, in hot aqueous hydrochloric acid, and like derivatives, are also useful to attain into at least some degree the objects of this invention.

The literature of the art of sewage treatment is replete with descriptions of sewage-treating apparatus, most of which consist of a series of settling and/or aeration devices (see Babbitt and Bauman, "Sewerage and Sewage Treatment," Eighth edition, John Wiley & Sons, Inc., New York, 1958, pages 323 to 712), which for economic reasons have been combined in various ways to minimize capital investment in pumps, separate tanks, and so forth. (See, for example, W. C. Laughlin, U.S. Pat. 2,114,601, issued Apr. 19, 1938, and G. F. Lambeth, U.S. Pat. 3,036,713, issued May 29, 1962.) Magnetic methods of treating sewage also have been studied before, as by Urbain and Stemen, U.S. Pat. 2,232,294, issued Feb. 18, 1941, and by W. C. Laughlin, U.S. Pat. 2,125,846, issued Aug. 2, 1938, and the effect of magnetic fields on certain biological processes is already known (Chemical & Engineering News, 40, Dec. 17, 1962, page 45; ibid., 41, January 21, 1963, pages 44–45). Designs for the separation of essentially uncharged particles from liquid in nonuniform electric fields have been published (Pohl, Scientific American, 203, No. 6, December 1960, pages 106 to 116), but no practical method of using nonuniform fields in the concentration of solids from sewage heretofore has been described. The basic problem of sewage treatment, of course, lies in the economics of concentrating the solids from the sewage in a sludge or residue of as low a volume as possible; once a reasonably concentrated sludge has been obtained, it can be hauled away and buried, oxidized to ash, as in the Zimmermann process (Chemical & Engineering News, 39, Oct. 23, 1961, pages 59–60; Chemical Week, Oct. 28, 1961, pages 73–76), or otherwise disposed of.

Convenient reviews of the prior art in the separation of solids from liquors are set forth by Melnechuk, International Science and Technology, 26 seq. (February 1963), and "The 1963 Sewerage Manual and Catalog File," published by Public Works Journal Corporation, 200 S. Broad St., Ridgewood, N.J. Contributions to be noted in the prior art include: U.S. 2,713,028 (continuous biological process); U.S. 2,414,930 (adjustment of pH with acid and addition of micro-organisms); U.S. 2,798,041 (trickling filter, aeration and recirculation); U.S. 2,270,869 (treatment of sewage under superatmospheric pressure); U.S. 2,528,649 (dewatering); U.S. 2,167,443 (aeration-coagulation); U.S. 2,043,458 (filter bed of chlorinated sewage slude and recyling); U.S. 2,562,510 (trickling filter and slude recirculation); U.S. 2,228,017 (centrifugation); U.S. 3,024,189 (aerobic bacteriological process); U.S. 2,676,919 (biochemical treatment with steady-stream upflow of liquid and oxygen); U.S. 2,559,462 (biological oxygenation); U.S. 2,360,811 (treatment under partial vacuum, especially to remove dissolved gas); U.S. 2,159,954 (treatment on asbestos and aeration); U.S. 2,921,684 (whirlpool separator); U.S. 2,783,890 (magnetic separator with scraper blades); U.S. 3,043,433 (inner-cone chamber); U.S. 2,987,186 (introduction of air at rotor-generated cone); U.S. 2,648,632 (coagulating device divided horizontally); U.S. 2,651,615 (circular clarifier with sludge airlift in peripheral tube); and U.S. 2,090,384 (aeration tank and venturi tube). Recent work worthy of note includes: a process for recycling high-density precipitated solids in water treatment (Chemical Week, page 69, Aug. 24, 1963); a two-phase disc contactor design to raise oxygen level of treated water (Chemical and Engineering News, page 94, Sept. 16, 1963); a packaged sewage treatment system including one or more compartments for primary settling, contact aeration, aerobic sludge digestion, and final settling, with associated equipment including air blowers, air lift pumps, and controls (Chemical and Engineering News, page 92, Sept. 16, 1963); an analysis of sewage-treatment costs and costs of sewage treatment plants (Chemical Week, page 115, Dec. 14, 1963); dehydration of digested or activated sewage sludge by treating with a negatively charged, and then with a positively charged, water-soluble organic polymer of high molecular weight, with specific mention of sodium styrenesulfonate having a molecular weight of several million, and amine-type polymethacrylate polymer (Dow Chemical Company, by R. Wiley et al., Belgian 612,513, Oct. 10, 1962; U.S. application Sept. 5, 1961); a design for eliminating internal scrapers and mechanism in treatment apparatus by using energy of water (Aitkin, Effluent Water Treatment J., 3 (5), 265–7 (1963); removal of detergent from waste water (U.S. 3,101,318); removal of cyanide wastes (U.S. 3,101,320); general review of recent literature on waste water and water pollution control (Okim et al., J. Water Pollution Control Federation, 35, 819–876 (1963)); acceleration of fermentation of organic wastes by addition of calcium and magnesium-containing algae, lithothamnion (Blaton, French 1,314,049 (Jan. 4, 1963)); processing and equipment for biological purification of effluents, including processing with compressed air in packed column (Albersmeyer, Belgian Pat. 622,391, Dec. 28, 1962; addition to Belgian 609,666); a method for removing organic solids from sewage by settling the sludge, oxidizing it wet with air under 300 to 3000 lbs./in.$^2$ pressure for 3 seconds to 3 minutes to remove 60 to 85 percent of the chemical oxygen demand, evaporating part of the remaining liquid but recycling the remaining organic phase as a nutrient for micro-organisms in settling tanks (Schoeffel, U.S. 3,060,118, Oct. 23, 1962); minor effect of copper on aerobic biological sewage treatment, in which 0.4 to 25 mg. copper ion/liter of sewage entering activated-sludge pilot plant had little discernible effect on the efficiency of the sewage-treating process (McDermott et al., J. Water Pollution Control Federation, 35, 226–41 (1963)); addition of alkali metal aluminates to reduce alum requirements for flocculating municipal water supplies (Starry, assigned to Nalco Chemical, U.S. 3,101,317, issued Aug. 20, 1963, on application of July 1, 1959); effect of copper, lead, and zinc on bacteria in sewage treatment (Zdybrewska et al., Przemysl Chem., 42 (4–5), 250–3 (1963)); demonstration that addition of 50 to 150 mg. copper (as hydroxide or sulfate) per liter of sewage added to sewage sludge increased both the total gas produced and the rate of gas production, in a batch process, but somewhat higher concentrations of copper had apparent toxic effect (Masselli, Masselli, and Burford, Wesleyan University, Middletown, Conn., New England Interstate Water Pollution Control Commission, 1961). Various new chemicals for treating water have been proposed recently, including a cyclic cationic polymer (Chemical and Engineering News, p. 46, (Feb. 24, 1964)), and nonionic, anionic, and cationic polymers (Chemical and Engineering News, p. 39, (Oct. 28, 1963)). Apparent adverse effect of small amounts of zinc ion on activated-sludge process has been shown, at least under some conditions (McDermott, Barth, Salotto, and Ettinger, Purdue Univ., Eng. Bull., Ext. Ser. No. 112, 461–75 (1963)). Other recent published papers of interest include: study of effects of pre-aeration, chemical precipitation, and mechanical flocculation in sewage treatment (Stones, Inst. Sewage Purif., J. Proc., 1963, Pt. 5, 443–6); adverse effect of shock loading of activated-sludge process with excessively high concentrations of copper ion (Directo and Moulton, Purdue Univ., Eng. Bull., Ext. Ser. No. 112, 95–104 (1963)); treatment of water with sodium sulfite and so forth (Hurwitz, Wastes Eng., 31, 260–2, 265 (1960)); the Tapleshay "total oxidation" process in which settled sludge is returned for reaeration with incoming sewage (Ramseier, Waste Eng., 31, 142–5 (1960); Tapleshay, Sewage and Ind. Wastes, 30, 652–61 (1958)); oxidation of organic chemical wastes in the presence of copper or iron halides under pressure in a corrosion-resistant reactor at 120°–200° C. (Consortium fuer Elektrochemische Industrie G.m.b.H., French 1,336,723 (Sept. 6, 1963)); operation of a "Zeta potential" pilot plant for treating municipal sewage at Norwich, N.Y. (Chemical Week, p. 84 (Nov. 16, 1963)); use of liquid ion exchangers to remove non-biodegradable detergents in self-service laundry operations (Chemical Week, page 67 (Aug. 17, 1963)); and many others.

The essence of our invention lies in provision of apparatus and processes for treating sewage with chemicals, which may or may not, but generally will, comprise weighting agent, in combination with novel modifications of one or more of the following sewage-treatment apparatus or processes: (1) pre-aeration; (2) sedimentation; (3) activated-sludge; (4) biological oxidation and (5) aerobic digestion. Auxiliary processes and devices for our overall method of sewage treatment are also disclosed—for example: heating of the slurry in which the chemicals are dispersed, prior to addition of the chemicals to the main body of the sewage, particularly in instances in which the weighting agent in the sewage-treating chemicals is calcined magnetite; use of magnetic fields (1) to agglomerate flocs in a flowing process stream comprising sewage, synthetic organic flocculating polymer, and ferromagnetic weighting agent, and/or (2) to effect a division between the sludge blanket of either plain settled sludge or activated sludge or other type of sludge ("fluidized bed" of ferromagnetic weighting agent and sludge), and the main aeration volume of supernatant liquor and/or (3) to speed up the biological degradation of sewage solids (for example, in the activated sludge process, biological filtration process, extended aeration process, modifications of these and/or similar processes, or otherwise); concentration of sewage solids in nonuniform electrical field; electrolytic oxidation and/or sterilization of treated sewage liquor; and such like. The details of optimum design of apparatus in any specific instance depends, of course, upon the specific facts of economics, sewage solids concentrations, and so forth, that obtain in that specific instance, but such design details—generally, arrangements and/or combinations of machine elements for greatest economy, in the light of elementary geometry and the general principle that water tends to seek its own level—will be clearly understood, in the light of our disclosure, by those versed in the prior art as set forth, for example, in certain of the patent and other literature references mentioned previously in this specification. Such design details as herein disclosed generally are, of course, intended to lie within the scope of our invention.

Our invention has many embodiments and possible embodiments, and to make as many of them as clear as possible, detailed drawings of various embodiments are supplied, in FIGS. 1 through 18 inclusive.

FIG. 1 shows a generalized flow diagram, in which the multitude of possible modifications and embodiments of our invention become apparent. This diagram shows the flow of raw sewage into mixing means 2, in which the sewage is mixed with chemicals; dotted and solid and dashed lines in the diagram indicate various alternate processing routes both before and after the step of mixing with treating chemicals.

Figure 5:
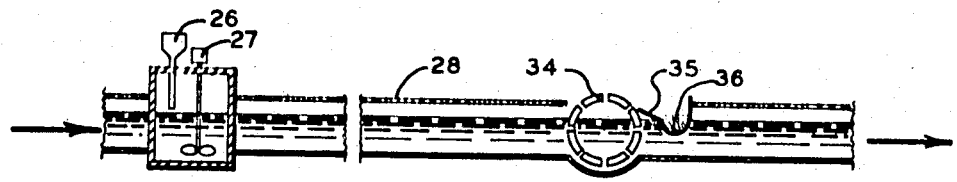
Figure 6:
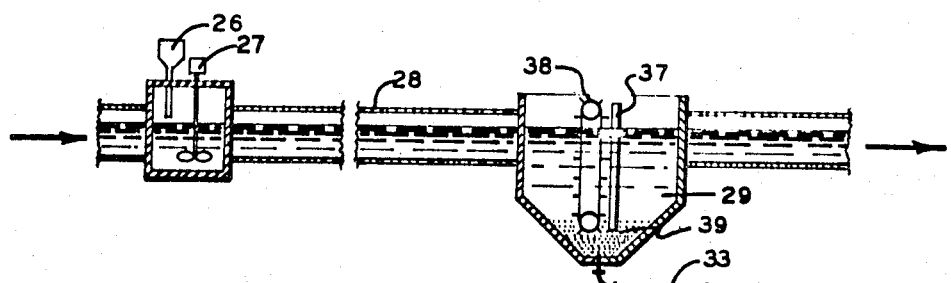
Figure 7:
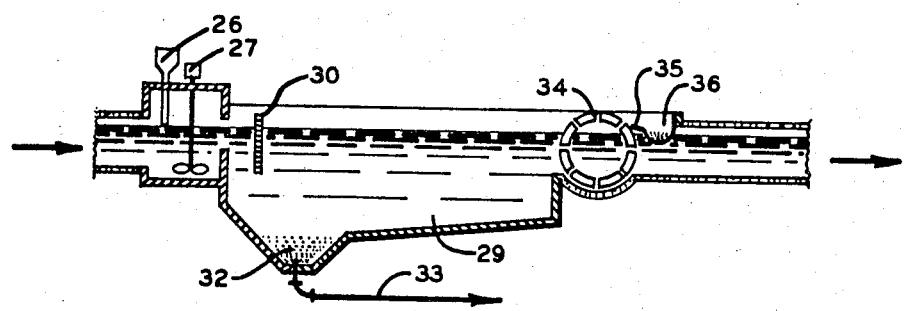
Figure 8:
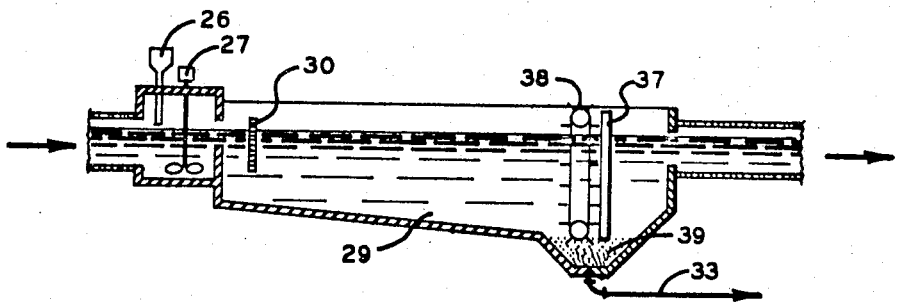

FIG. 5 shows a solids separator comprising a magnetic drum. FIG. 6 shows a solids separator comprising a bar or plate magnet that can be cleaned continuously with a cleated belt. FIGS. 7 and 8 show separators in which extension of the holding tank provides space for simple sedimentation prior to magnetic removal.

FIGS. 9, 10, 11, 12, and 13 show mechanical devices of various kinds adapted to provide for intimate contact of sewage with oxygen in contact with oxidation catalyst.

Figure 14:
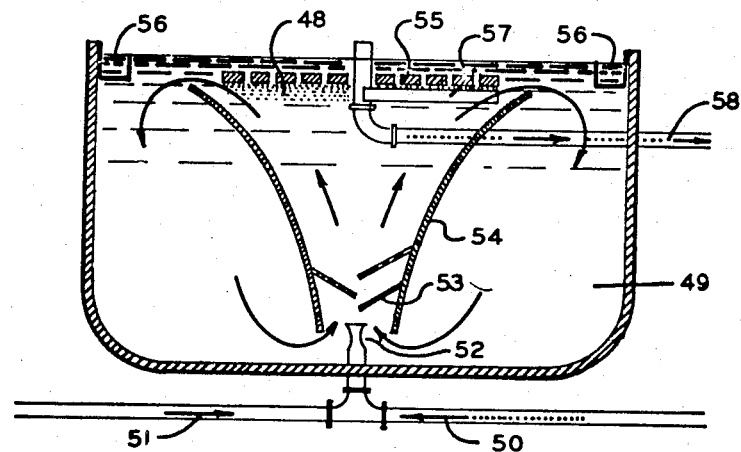
Figure 15:
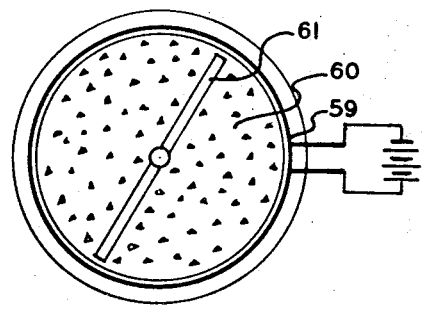
Figure 16:
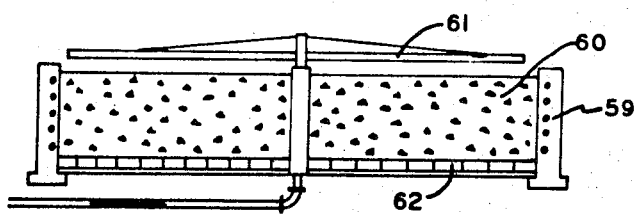
Figure 17:
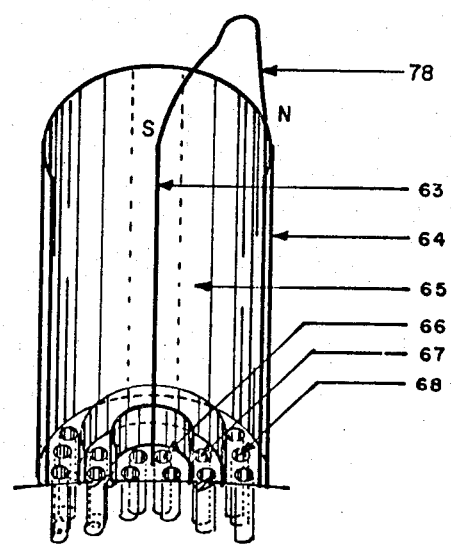
Figure 18:
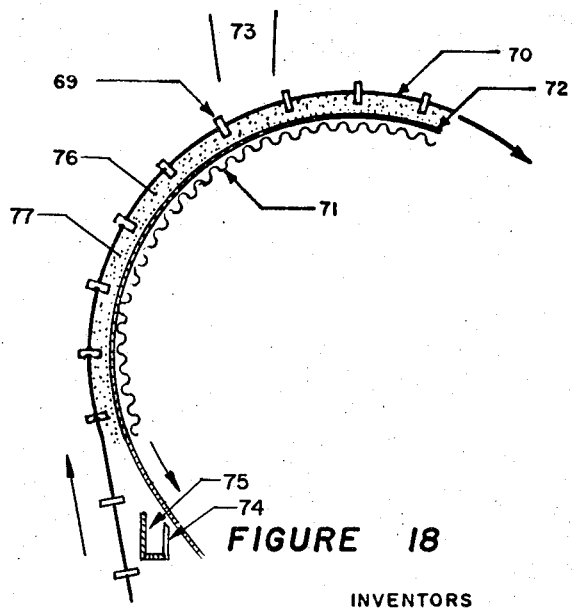

FIG. 14 shows in cross-section a "fluidized-bed" treatment chamber useful in the treatment of sewage. FIG. 15 is a view from the top, and FIG. 16 a view in cross-section, of a biological filter adapted to work with a strong magnetic field in the treatment area. FIG. 17 shows a non-uniform field treater of novel desgin, and FIG. 18 shows a rotary filter.

In one of the preferred embodiments of our invention (see FIG. 1), sewage—such as municipal sewage—may be passed through a particle size limiter 1, such as a bar screen, comminutor, combination of bar screen and comminutor or such like. The particle size limiter either reduces or removes particles too large to be conveniently and properly treated in the subsequent treatment equipment.

From the particle size limiter 1, the sewage is passed into a mixer 2, or optionally, through pre-aeration stage 3, which may be, for example, a catalytic oxidizing chamber, and thence into mixer 2. The flash mixer 2 may be a commercial flash mixer, pump, or such like. This mixer disperses treating chemicals thoroughly in the sewage, said chemicals being introduced into the mixer from chemicals feeder 4, sometimes in dry form, but in most instances in the form of a slurry of chemicals in a small flow of sewage diverted from the main stream of sewage. Particularly in cases in which the chemicals being added comprise a mixture of synthetic cationic organic flocculating material and calcined magnetite, it may be advantageous to heat, in heater 5, sewage used to make the chemicals slurry. Optimum retention time of slurry in the chemicals feeder may vary from a few seconds to perhaps thirty minutes, depending upon the temperature of the admixed sewage, the ease of dispersibility of the chemicals in the sewage, and other factors determined empirically.

From the flash mixer 2, the treated sewage is led to a flocculation chamber 6, which consists generally of a sedimentation tank optionally equipped with mechanical flocculation means, of sufficient volume so that retention time of sewage in the tank generally will be in the range of 10 to 30 minutes, and so that the volume of sewage retained is in a substantially quiescent state while in the tank. In consequence of this substantially quiescent state (i.e., low linear rate of flow) of the treated sewage while in the flocculation chamber 6, solids drop out to form a sludge mass at the bottom of the tank, which is removed.

Figure 2:
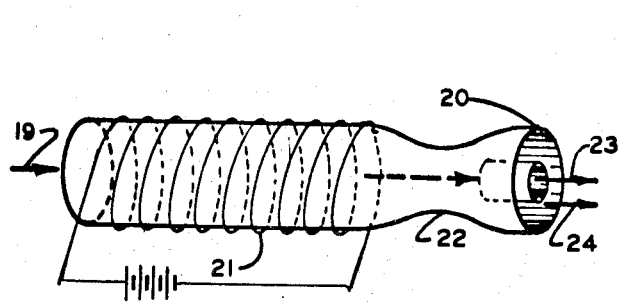
FIG. 2 shows a magnetic agglomerator of one design.
Figure 3:
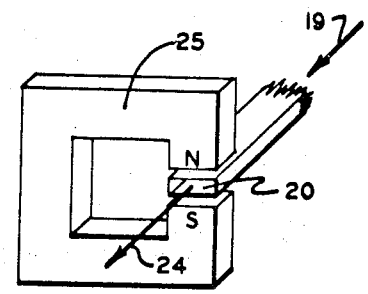
FIG. 3 shows another design of apparatus for exposing a flowing liquid to a magnetic field.

From the flocculation chamber 6, the treated sewage is preferably conducted into the magnetic agglomerator 7, in which the process stream is passed through a magnetic field with the north-south axis of the magnetic field parallel to the direction of flow of sewage, as in FIG. 2, perpendicular to the direction of flow of sewage as in FIG. 3, at some angle between 0° and 90° to the direction of flow of sewage, or successively through a series of magnetic agglomerators each having a magnetic field disposed at a different angle to the direction of sewage flow.

The magnetic field of the magnetic agglomerator 7 may be created either by electromagnetic means, utilizing, generally, direct current, as in FIG. 2, or by a permanent magnet, as in FIG. 3. (See Parker and Studders, "Permanent Magnets and Their Application," John Wiley & Sons, Inc., New York, 1962, pages 220–224.) In simplest form, the agglomerator, FIG. 2, consists of a non-magnetically susceptible tube, conduit, or equivalent, through which the treated sewage is passed from inlet 19 and out through outlet 20. The magneic field may be imposed by an external coil 21 energized generally by direct current, supplied by a battery or similar source and with turns of the coil generally more concentrated in the middle of the coil than at the ends (particularly at the outlet end, where a sharp drop in magnetic field strength may tend to disrupt any agglomerates formed), or the magnetic field may be imposed by an external permanent magnet 25 or, in some cases by passage of a current through the sewage. The dotted arrow of FIG. 2 indicates that, in the treatment of certain kinds of process fluids, at high current flow in the external coil, a type of effect can be obtained—perhaps related to so-called "pinch effect" phenomena—which can be utilized to concentrate magnetically susceptible material in the center of the flow, or at least thoroughly agglomerate said material, whence the magnetically susceptible material can be led, through the narrow neck 22 of the tube, into a concentrically disposed smaller "sludge withdrawal" tube 23, while mother liquor would flow out through the annular channel 24. In such quasi—"pinch effect" agglomerators, of course, the coil 21 generally would be disposed preferably over the neck 22. (See Richard F. Post, "Fusion Power," Scientific American, 197, No. 6, pages 73–84, December 1957.) Our magnetic agglomerators are economically effective under ordinary conditions—that is, as at reasonable electrical current input, on aqueous sewages—only if the added chemicals comprise magnetically susceptible solid particles, generally of ferromagnetic nature.

From the magnetic agglomerator, the treated sewage is led to sedimentation chamber 8. Settled sludge, containing chemicals and weighting agent optionally may in part be returned to the flocculation chamber 6 and be re-cycled through said flocculation chamber and optionally magnetic agglomerator to effect economies and improve efficiency of the process. The balance of the sludge from sedimentation chamber 8 is withdrawn to the sludge disposal means 16. Effluent from sedimentation chamber 8 may be led to aeration chamber 10 for secondary treatment and oxidation of dissolved solids similarly to the so-called activated sludge process or modifications thereof, or alternately, said effluent may be led through the biological oxidation filter 18, which may be a "low rate" filter without recycling of filter effluent, or the "high rate" type of filter in which the filter is charged with a uniform rate of flow and in which variations in sewage flow are compensated for by returning filter effluent to the primary phase of treatment, namely the flocculation chamber 6 or sedimentation chamber 8, after passing through the final settling tank 11.

Solid state oxidation catalyst means disclosed hereafter for aeration means in aeration chamber 10 and/or spray bars and filter underdrains in biological oxidation filter 18 expedite the treatment process. In consequence, the aeration chamber or biological oxidation filters employed may have higher throughput capacity per unit of enclosed volume, but otherwise may be of the general types and geometric proportions conventionally used, with sludge recycling means and disposal as presently practiced in the sewage treatment field.

Figure 4:
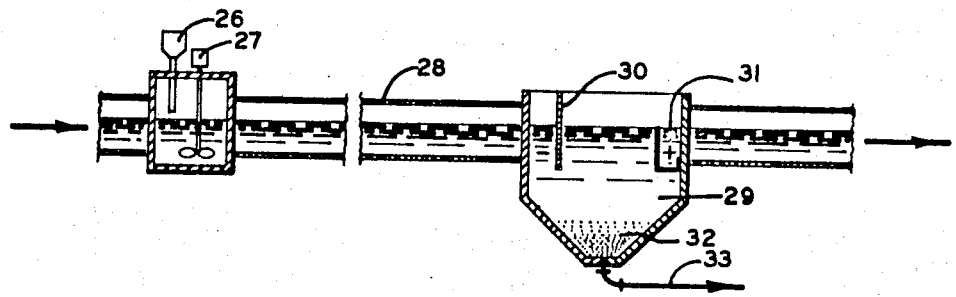
FIG. 4 shows a mixer-treater-sedimentation treating device of simple design.

A satisfactory alternate to passage of sewage through the train, flocculation chamber 6, magnetic agglomerator 7, and sedimentation chamber 8, in some cases will be passage through the separator 9 with sludge removal means, as represented by the mechanical processes represented by FIG. 4, FIG. 5, and FIG. 6. In FIG. 4 untreated sewage is treated with chemicals, added from chemical feeder(s) 26, in flash mixer 27, after which the sewage is conducted through 28 with a velocity in the conduit high enough to prevent sedimentation, and low enough to allow flocculation. The flocculated sewage is led into sedimentation chamber 29. Baffle means 30, optionally adjustable weir trough means 31, sludge hopper means 32, and withdrawal means 33 are provided as in convention sedimentation tank design.

In FIG. 5, untreated sewage is treated with chemicals by 26, 27, and 28 as in FIG. 4, said chemicals comprising weighting agent that is magneically susceptible. A conduit means is provided as described in FIG. 4 above. From the conduit, the treated and flocculated sewage is passed across a revolving magnetic drum 34, moving magnetic belt, or equivalent moving magnetic means, wherefrom the chemically flocculated sewage solids, with a magnetically susceptible weighting agent entrained therein, are removed by a sludge scraper 35 from the magnetic drum 34, moving magnetic belt, or equivalent moving magnetic means, into a sludge withdrawal trough 36 and led to disposal means. The clarified effluent, having passed through the magnetic separation station, is led away for disposal or further treatment by conduit means or otherwise.

In FIG. 6, untreated sewage is treated with chemicals by 26, 27, and 28 as in FIG. 4, said chemicals comprising weighting agent that is magnetically susceptible. A conduit means is provided as described for FIG. 4 above. The treated and flocculated sewage is then passed through a system of magnetic bars 37, wherefrom the chemically flocculated sewage solids, with magnetically susceptible weighting agent entrained therein, are removed by a sludge scraper 38 which may be a continuous belt, reciprocating arm, or equivalent mechanism, into sludge hopper 39 whence the sludge may be withdrawn through sludge withdrawal means 33.

In certain designs of our sewage-treating apparatus, it may be advantageous to combine features of both FIG. 5 and FIG. 6, so that both the magnetic element and the scraping element are in motion with respect to the surrounding sewage-containing means.

Figure 1:
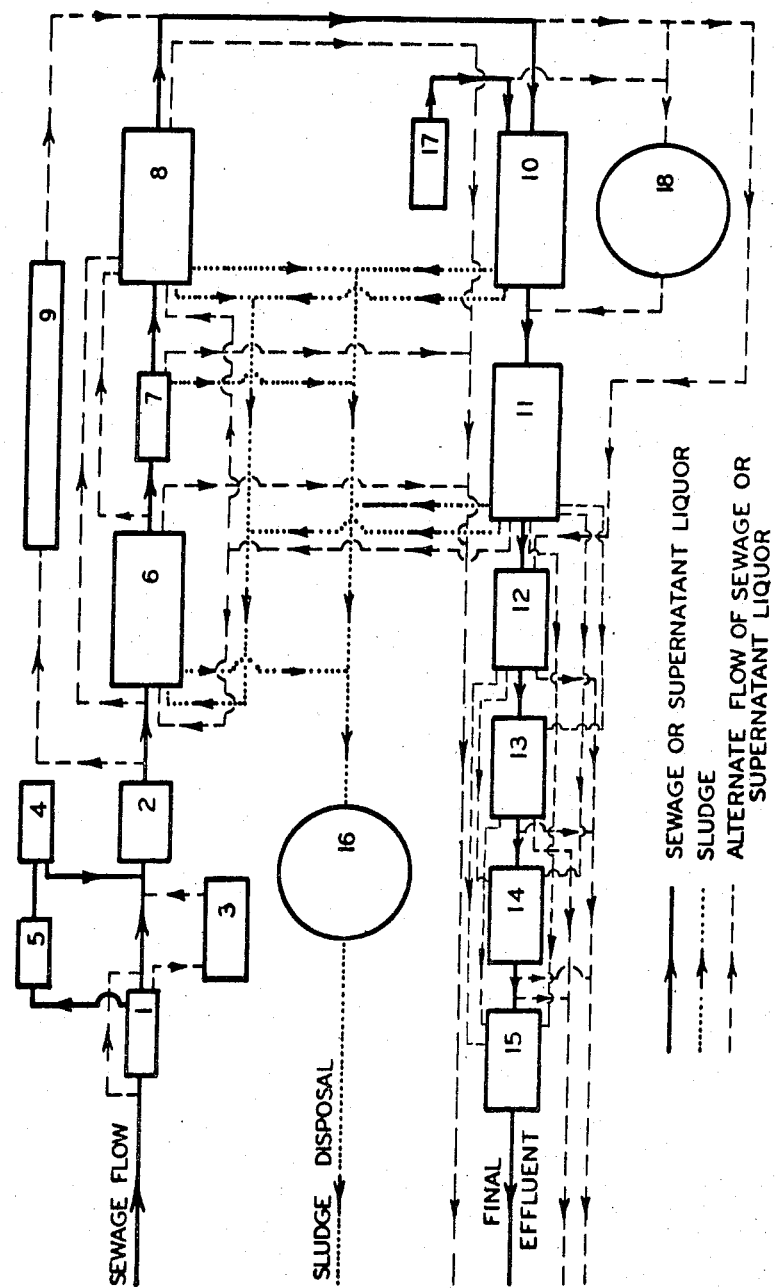

A satisfactory alternate to passage of sewage through the train, flocculation chamber 6, magnetic agglomerator 7, and sedimentation chamber 8 in some cases will be passage through the separator 9, with sludge removal means, all as shown in FIG. 1, as represented by the mechanical processes represented by FIG. 7 and FIG. 8.

Figure 9:
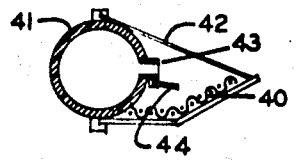
Figure 10:
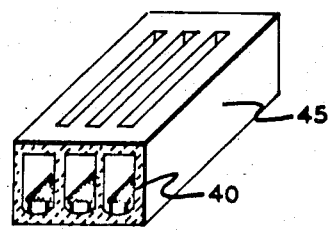
Figure 11:
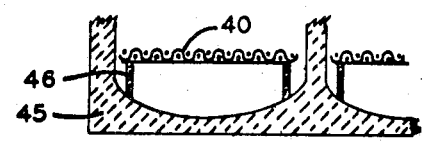

In, or prior to, treatment of sewage liquor in the biological oxidation filter means 18, soluble and/or dispersible oxidation catalyst optionally may be added to the influent, and/or solid state oxidation catalyst 40 in the form of a screen and/or particulate solids enclosed within a screen mounted on the rotary distributor arm 41, as shown in FIG. 9, may be employed. The solid state oxidation catalyst 40 is secured to the distributor arm 41 by a support 42 disposed toward spray nozzles 43 and splash plates 44 in such a manner that maximum contact between the sewage liquor and air on the surface of the solid oxidation catalyst 40 is obtained. Solid oxidation catalyst 40 may also be placed in filter underdrain blocks 45 as shown in FIGS. 10 and 11. It frequently is desirable to add height adjustment means 46 in the filter underdrain blocks 45, adapted to adjust the height of the solid oxidation catalyst screen or bed of particles so as to provide maximum contact of sewage liquor and air on the surface of the oxidation catalyst, and it frequently may be desirable to introduce large quantities of air into the underdrain system through ports provided for such service. A commercial grade of oxygen gas may also be introduced into the underdrain system in this manner, with or without oxidation catalyst.

Figure 12:
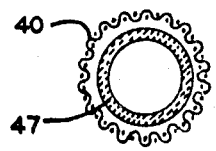
Figure 13:
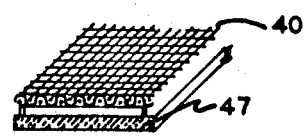

In, or prior to, treatment of sewage liquor in aeration chamber means 10, soluble and/or dispersible oxidation catalyst optionally may be added to the sewage liquor, and/or solid state oxidation catalyst 40 in the form of a screen and/or particulate solids enclosed within a screen may be mounted on or about air diffuser elements 47 as in FIGS. 12 and 13, and/or particulate solid oxidation catalyst suitably sintered together may actually constitute material of air diffuser elements.

We have found that truly remarkable results may be obtained by installing a nutrient feeder 17, and continuously feeding certain nutrients for biological processing into the sewage at the aeration chamber 10 (in the activated-sludge modification of our apparatus) or just prior to introduction into the biological oxidation filter 18 in another modification of our process.

Even more remarkable results are obtained, in one embodiment of an activated-sludge modification of our apparatus, by use of a "fluidized-bed" apparatus constructed and inserted in the process flow sequence at the position of 6, 7, 8, or 9 (see FIG. 1). This embodiment permits more rapid biological processing of many types of sewages, apparently because of the strong magnetic field established in at least part of the treatment chamber. The embodiment shown in FIG. 14, however, is especially applicable to sewages which have been treated with chemical compositions comprising ferromagnetic particles such as magnetite.

In the "fluidized-bed" chamber shown in FIG. 14, sludge blanket 48 in effect becomes a filtration medium of higher efficiency than in horizontal flow (FIGS. 5, 6, 7, and 8) or in a downward flow. Sludge is conducted into the chamber 49 through conduit 50, is mixed with influent sewage introduced through conduit 51, and passed through a venturi-type throat 52.

In the "fluidized-bed" chamber 49 itself, the sewage-sludge mixture is fed upflow into a large vertical funnel 54 (optionally fitted on its influent side with spirally disposed mixing baffles 53). Preferably, all parts of the unit, including the side walls of the tank 49 but certainly at least the top portions of the funnel (54) walls, should be built of material that is substantially non-magnetic—viz., concrete, polypropylene plastic, and/or such like. The walls of the funnel should slant outwards toward the top.

Across the open top of the funnel there is disposed a grid or network 55 of means, such as permanent magnets, electromagnets, insulated wires carrying large currents, some combination of these means, and/or such like, for maintaining a strong magnetic field at the top of the funnel, sufficient to minimize passage of small ferromagnetic particles through the top of the funnel at high upflow rates. Aeration of the treated liquor may be effected above the magnet network by mounting air diffusers just above the magnets, or aeration of the treated liquor may be carried out in a separate aeration tank. Aeration may be simple diffuser aeration, or aeration using a catalyst as previously pointed out in this disclosure.

Clarified effluent is removed from the process through effluent weirs and troughs 56 located near the top of chamber 49. Sewage-sludge mixture continuously recycles through the unit, from a point between the bottom of the funnel and the bottom of the tank, up through the funnel, and around back to the bottom of the tank through the annular space between the outside of the funnel and the inside of the tank. Sludge is continuously withdrawn from a point just below the magnetic grid by means of a rotating non-magnetic trough 57, and/or equivalent means, and led out of the unit through sludge effluent pipe 58.

In one embodiment of our apparatus, the sewage is passed from the sedimentation chamber 8 directly into a biological oxidation filter 18, rather than into the activated-sludge tank 10. Nutrients, in this modification, are preferably fed into the sewage from nutrient feeder 17 at a point just prior to introduction of the sewage into the biological oxidation filter. In the biological oxidation filter 18 itself, certain sewage classes may be treated in a very strong magnetic field, which may be maintained by a large coil 59 of (optionally) super-conducting material—see top view in FIG. 15 and cross-sectional view FIG. 16—through which is passing preferably direct electric current supplied by a battery or similar source. The bed of filter media 60 in the unit should not be magnetically susceptible, and the sewage treated at this point preferably should contain a minimum amount of, and preferably no, ferromagnetic particles. Spray system 61, underdrain system 62, and other features of this unit follow conventional practice.

Many of the types of magnetic separators conventionally used for ore separation, removal of tramp iron, handling of metal parts, and such like are also of utility in effecting the separation of iron ore-weighted flocculated material from sewages treated with our organic flocculating polymer/iron ore weighting agent compositions.

A magnetic separator of particular utility is of the general design shown in FIG. 17, and utilizing the principle that geometry of the agglomerator can be controlled to create an intense magnetic field at a central magnetic pole. This same general principle can also be used to create an intense electrical non-uniform field at the central pole.

In a magnetic-separator embodiment of the design shown in FIG. 17, the central pole 63, of iron wire or other ferromagnetic substance, is made one pole of a magnet, and the outside wall 64, of iron or other ferromagnetic substance, is made the other pole of the magnet, or at least the magnetic means are so arranged so that 63 and 64 are of opposite polarity. There is thus created a situation of non-uniform field strength, with the field particularly intense near the central pole 63. Sewage containing magnetically susceptible material is then passed into the unit, at the end opposite exit ports 66, 67, and 68; the ferromagnetic or other strongly magnetically susceptible material in the sewage tends to agglomerate the flocs and bring them together in bridges between 63 and 64, and the movement of the sewage through the unit tends to carry the flocs toward the exit ports, particularly if the magnetic field is occasionally cut off or even reversed briefly. Since the magnetic field's most intense part of the field is near 63, the fluid recovered from exit ports 66 tends to be concentrated sludge, the material recovered from exit ports in the region roughly midway between the two poles 63 and 63 tends to be solids-depleted liquor, and the material recovered from exit ports 68 near the outside wall 64 tends to be dilute sludge of agglomerated solids content which optionally may be mixed with influent sewage and run back through the unit through the inlet opposite exit ports 66, 67, and 68.

The electric-field analogue of the type of agglomerator and separator shown in FIG. 17 is run in the same manner, except that opposite electrical charge or polarity is put on the inside and outside poles, 63 and 64 respectively. To speed moving of the "bridges" down toward the exit ports, the electric field may sometimes have to be cut off briefly, or even reversed. To prevent excessive loss of electric power in this type of unit, non-conductive electrical insulation covering partly or wholly one or both of the two oppositely charged electrodes 63 and 64 may be desirable.

One of the embodiments of sludge disposal means 16 of considerable interest comprises a novel type of filter wherein a tightly woven (or equivalent structure of relatively low porosity) filter cloth 72 is drawn over a porous base 71 at a relatively high rate of speed, and the thin, relatively compact zone of the filter cake 76 immediately adjacent to the cloth 72 is scraped off continuously by a doctor blade 74 into a sludge withdrawal trough or equivalent means 75, while a more slowly moving belt of high-porosity 70, fitted with bars 69, and in some of the preferred embodiments of our invention moving countercurrent to the filter cloth 72, moves the filter cake zone of high water content over the top of the thin zone of filter cake, the zone of high water content being shown as 77 in FIG. 18, moving over the thin compact zone of filter cake 76, the sludge itself being fed onto the unit from inlet 73, falling through the porous belt 70, down toward the doctor blade area of 74, and being hauled up continuously by the slats or bars 69. Obviously, various geometric configurations and orientations with respect to gravity, magnetic field and/or vacuum if any applied on the side of the filter cloth 72 are possible, and the configuration and orientation of FIG. 18 represent only one possibility: in this embodiment, the filter cloth 72 is conceived as wrapped closely about a cylindrical porous filter arranged in such a manner so that vacuum can be applied from the inside of the cylinder, and the porous belt fitted with bars 69 is conceived as being arranged in belt-and-pulley fashion with respect to the cylindrical vacuum press so that the belt separates from the cylinder near the area of the doctor blade 74. Spacers to keep 70 from too closely hugging the surface of the cylindrical filter area are normally required; depending on the viscosity of the sludge treated, the optimum spacing between the cylinder and the belt 70 may vary from one-half inch to three inches.

Other embodiments of our invention will be readily understood by reference to FIG. 1, which shows various alternates and combinations thereof, any of which may be preferable under a certain set of circumstances. It should be noted that ionic (e.g., cationic) polymers having a skeletal chain structure that is resistant to degradation by heat, hydrolysis, bacterial attack, or the like offer substantial advantages in the practice of our invention particularly in instances where it is desired to recycle the treating chemical, as (1) by treating the raw sewage with ionic polymer and weighting agent, (2) settling the flocculated solids containing most of the sewage solids, the ionic polymer, and the weighting agent, (3) degrading the sewage solids, but not the ionic polymer or the weighting agent (to any really significant extent), by hydrolysis, oxidation, heat, bacterial attack, or the like in a vessel preferably separate from the settling/sedimentation vessel, and (4) recycling the undegraded polymer and weighting agent from the degradation phase along with make-up chemicals, back into the main settling/sedimentation vessel. (This general type of recycling process is also applicable in the use of weighting agents with anionic and/or certain non-ionic polymers having molecular weights in excess of 10,000 and resistance to hydrolysis, oxidation, heat, bacterial attack, or the like.)

The ferruginous material we have used in the practice of our invention has been, of course, iron ore, in most instances along with ferric chloride. Other iron compounds may be used, but we have found the best results are obtained where the ferruginous material is of such a nature that it produces ferrous hydroxide and/or ferric hydroxide on reaction with water, and further when any fraction of the ferruginous material which remains a hard, substantially water-insoluble solid on dispersion in water has a particle size such that substantially all of said fraction passes 50 mesh U.S. Standard Screens.

Water-dispersible negatively charged flocculating agents (that is, anionic flocculating material) useful in the practice of this invention have been, for the most part, anionic polyelectrolytes having molecular weights in excess of about 10,000, of sufficient ionization strength (or containing phenolic, carboxylic, sulfonic, or phosphorus-containing acidic groups) to form salts with alkali cations to a substantial extent in water dispersion at pH values below 12, and certain compositions of matter comprising such anionic polyelectrolytes.

Two organic flocculants we have found especially useful in the treatment of sewage by our processes and treating equipment are (1) product obtained by reacting phosphoric acid and polyvinyl alcohol together and subsequently neutralizing with cold aqueous sodium hydroxide, and (2) phosphorylated starches obtained by treating corn starch with phosphorus oxychloride in pyridine, by a procedure adapted from Samec, "Kolloidchemie der Starke," Steinkopff, Leipzig, 1927, said phosphorylated starches having particular advantages in sewage-treating processes wherein air is blown through the sewage (see Green, "Biological Oxidation," Scientific American, 199, 56–62 (July, 1958).

It should be noted that this invention deals with the removal chiefly of water-insoluble materials of high molecular weight by treatment with compositions of matter comprising water-dispersible resins (in some cases containing carboxylic groups), in distinct contrast to the earlier work co-authored by one of us wherein is described, for the most part, the removal chiefly of water-soluble materials of low molecular weight by treatment with substantially water-insoluble resinous beads containing carboxylic groups (Robert Kunin and Ruth E. Barry, "Equilibrium and Column Behavior of Exchange Resin— Carboxylic, Weak Acid Types, Cation Exchange Resins," Industrial and Engineering Chemistry, 41, 1269–72, (1949)).

In any consideration of the following examples, it should of course be kept in mind, as will be obvious to those skilled in the art, that the optimum dosage of chemical coagulants for any particular sewage to be treated is distinctly an individual problem, and can be best determined only by actual tests (Babbitt and Baumann, "Sewerage and Sewage Treatment," Eighth edition, John Wiley and Sons, Inc., New York, 1958, page 449; Water Works and Sewerage, 81, 358 (1938)). However, we have frequently found the optimum concentrations of each of the chemical classes used in our invention—e.g., cationic polymer of the type herein described, iron ore weighting agent, and (optionally) negatively charged flocculating agent—lie in the range of from about 1 to about 300 parts of chemical per million parts of aqueous liquor to be treated, and quite generally in the range substantially below about 10 parts of chemical per million parts of aqueous liquor to be treated; that is, in specifying chemical dosages, the numbers we actually give can be only approximate, and, as it were, "order of magnitude."

Furthermore, in any consideration of the following examples, it should be kept in mind that the actual processes of treating and separating aqueous liquors in accordance with our invention may involve modifications—such as, for example, the use of magnetic fields, centrifugation, electrostatic fields, or the like, in addition to, or instead of, gravity to accomplish rapid separation ("sedimentation") of flocculated material—without departing from the intended scope of our invention. In addition, it should be kept in mind that greatly superior results to those reported here may be expected in plant-scale practice of our invention, particularly in embodiments employing in modified form such processes as the Guggenheim method (Sewage Works Journal, 104 (January 1942); ibid., 973 (September 1944) or the Putnam method (Babbitt and Baumann, "Sewerage and Sewage Treatment," Eighth edition, John Wiley and Sons, Inc., New York, 1958, page 457) or modifications thereof. Finally, it should be noted that optimum results, from both technical and economic standpoints, are achieved in the practice of this invention in accordance with the special processes described herein, and/or in the types of special treating equipment specified herein or currently available for use.

In particular, in instances wherein cationic polymer, weighting agent, and negatively charged anionic flocculating material are employed in the treatment of sewage, the proportion of the materials used is frequently of importance in determining rapidity and completeness of flocculation, and overall cost of treatment. Again, for best economy of operation, it may be desirable in some treating plants, and in particular in some sewage treating plants, as where the settled solids from the flocculation tanks are dried and burned, to recover at least the iron ore weighting material from the burning step, and recycle at least part of the ferruginous material through the settling process again and again, by means of equipment adapted for such purpose. In such recycling operations, of course, it should be kept in mind that certain of the most generally applicable clarifying agents in the practice of our invention contain from about 1 to about 100 parts of cationic polymer and from about 1 to about 100 parts of iron ore weighting agent, and that in processes wherein negatively charged (anionic) flocculating material is used in addition to cationic clarifying agent comprising cationic polymer and ferruginous material (iron ore weighting agent), the optimum dosage of such negatively charged flocculating material will generally be about equal to the dosage of cationic clarifying agent, but may vary, in some instances, from as little as one hundredth to as much as a hundred times as much. Again, special equipment may often be desirable for the pre-dispersion prior to introduction into the main body of aqueous liquor to be treated, for we have found that our treating agents generally work most efficiently when added in the form of dilute dispersions. In the formulation of these dilute dispersions, we have found that rapid and vigorous agitation of the dry clarifying agent powder in about 30 to 300 times its weight of water gives good results, especially if some heat is applied to the slurry during the mixing step. Thus, in using both cationic clarifying agent and negatively charged flocculating material in the treatment of aqueous liquor (e.g., sewage), it may sometimes be advantageous to use a treating device consisting of a large settling tank fitted with a gentle-agitation device, and two smaller mixing tanks, each of which is fitted with vigorous-agitation devices and perhaps also heaters, said large settling tank and said smaller mixing tanks being connected by valved passageways, and where necessary, pumps. In equipment of this type, the cationic clarifying agent and iron ore weighting agent may be dispersed rapidly in one tank, the negatively charged flocculating material dispersed in the other tank, and the two slurries then added slowly to the larger settling tank in a proportion determined by the valves and/or pumps in the passageways connecting the tanks. In the invention claimed herein, the ionic polymer and the iron ore generally should be mixed dry, and predispersed separately from any flocculating material of opposite charge that may be used; however, it is possible, but generally not as convenient, e.g., to disperse a cationic polymer in water in one tank, disperse the iron ore weighting agent separately in another tank, and then mix these two slurries with the sewage, all separately from the dispersion of any anionic flocculating material in the sewage. If the ionic polymer is dispersed in the main body of sewage, and the iron ore is THEN added, much of the iron ore will simply drop to the bottom of the tank, without becoming enmeshed as an integral part of the floc formed. It is important, in other words, to add the ionic polymer and the iron ore together (either dry or predispersed in water, to the main body of the sewage), and separately from any different flocculating material, to obtain to maximum degree the synergistic effects of our invention. In other words, to capitalize on the synergistic effect of the proper type of cationic polymer, as specified herein, and ferruginous material, comprising iron ore weighting agent, in the combination disclosed herein, it is important that these components be mixed, or preferably ground, together prior to addition to the aqueous liquor to be treated. In addition, use of such a pre-mixed combination makes possible economy, ease of control, and ease of handling in plant-scale operations. However, some degree of clarification normally may be effected by mixing these components during admixing of the clarifying material with the aqueous liquor to be treated.

We have found that the order in which various clarifying agents are added may be of importance in some cases, and special equipment of the type described above is well adapted to take advantage of any efficiencies and/or economies of operation which may be realized through appropriate changes in the order and/or method by which our treating chemicals are added to aqueous liquors. Best results are obtained, for example, in the treatment of many sewages (e.g., sanitary sewages, certain raw water supplies if negatively charged (i.e., anionic) flocculating material is added before the cationic clarifying agent.

The tests of clarification of aqueous liquors (sewages) set forth in the examples below were run in standard Imhoff cones, according to the method adapted from the standard procedure for sewage sedimentation test set forth in the book, "Standard Methods for the Examination of Water, Sewage and Industrial Wastes," tenth edition, published in 1955 by the American Public Health Association, of New York city (page 272). In each instance, the aqueous liquor to be processed was poured into a standard Imhoff cone having a capacity of 1000 milliliters, the chemical reagent(s) added at the top, the liquor composition stirred for approximately ten seconds with a glass rod 6 millimeters in diameter and 40 centimeters long, and the whole composition the allowed to settle for 7½ to 60 minutes. In instances where the chemical treatment was done in two stages, chemicals were added in both stages, with the same amount of stirring after each stage of treatment, and generally with the lapse of only 30 to 60 seconds between the two stages of chemical treatment. In a few cases where magnetite was included in the ferruginous material, sedimentation was accelerated by placing a powerful magnet under the cone. Novel features and/or modifications of the general apparatus of invention where such features are mentioned herein, such as the orientation of the magnetic field to speed sedimentation, are intended to be included within the scope of our claims. Since a major reason for employing chemical treating agents is to reduce the size of the treating equipment, settling times of 7½ to 15 minutes have generally been used for the comparison of various treating agents, rather than the more conventional retention periods of 1 to 3 hours. Imhoff cones are shallow, as compared to plant-scale settling equipment, and commercial experience has shown repeatedly that completeness of flocculation, sedimentation, and B.O.D. (Biochemical Oxygen Demand) removal, economy and efficiency of operation, and so forth, are generally enhanced by using treating tanks more than 7 feet deep, recycling at least part of the sludge, and so forth. Accordingly, the results given in the following tables should be interpreted in the light of the conditions of operation, and it will be appreciated that much better results may be expected in plant-scale operations.

The clarity index of the supernatant liquor obtained in our tests after various periods of sedimentation was measured by observing the amount of light, in foot-candles, transmitted through a layer of supernatant liquor 5 inches thick, from a white-light source of constant intensity. Raw, unsettled aqueous liquor, before chemical or mechanical treatment of any kind, was assigned a "Clarity Index" of 100. The "Clarity Index" of a treated liquor was calculated by dividing the amount of light, in foot-candles (from the white-light source of constant intensity previously described), transmitted through a layer of the treated liquor 5 inches thick, by the amount of light, in foot-candles, transmitted from the same light source through a layer of raw unsettled liquor 5 inches thick under the same conditions, and then multiplying the resultant ratio by 100. For example, if the amount of light tranmitted under standard conditions described was 6 foot-candles in the case of treated liquor and only 4 foot-candles in the case of raw unsettled liquor, the "Clarity Index" of the treated liquor was calculated to be $(6/4) \times 100$, or 150. The "B.O.D. Index" (Biochemical Oxygen Demand Index) was calculated in somewhat analogous fashion: the "B.O.D. Index," as set forth in the tables below, refers to a calculated index value obtained by measuring the proportion of biochemical oxygen demand removed from the raw liquor by chemical treatment of the type specified in the table, multiplying this quantity by 100, and finally dividing by the proportion of biochemical oxygen demand removed from the raw unsettled liquor by simple settling over the length of time specified in the table. For example, if the biochemical oxygen demand of supernatant liquor recovered from a given type of chemical treatment of an aqueous liquor, after a given period of settling, was found to be 40 percent lower than that of the raw unsettled aqueous liquor, whereas the supernatant liquor obtained by simple settling of the same type of aqueous liquor was found to have a biochemical oxygen demand of only 20 percent below that of the raw unsettled aqueous liquor, the "B.O.D. Index" of the chemically treated aqueous liquor would be calculated to be $(40/20) \times 100$, or 200.

The sanitary sewage use in the "First Series" of examples below was taken from the municipal sewage system of a small city in the north central part of the United States, and contained all of the usual types household and sanitary wastes, but essentially no industrial wastes. All of the Examples (1 to 4 inclusive) of the "First Series" involved the use of aliquots of the same batch of municipal sewage, having a chemical composition aproximately normal for sanitary sewage in the United States, and being characterized by a pH of 7.6. The cationic starch employed in the "First Series" was a cationic modified corn starch having approximately one amino group per 20 anhydroglucose units, and was characterized by a molecular weight of about 1,000,000. The ferruginous material employed in the "First Series" comprised iron ore and ferric chloride, said iron ore consisting of hematite from the Mesabi Iron Range of northern Minnesota, in the United States, and graded so that substantially all of the iron ore passed through an 80-mesh U.S. Standard Screen, but was retained on a 100-mesh U.S. Standard Screen, while the ferric chloride employed was an ordinary grade (so-called "sewage-treatment grade") of ferric chloride. The (anionic) "organic polymer" (flocculating material) specified in the "First Series" was a styrene-maleic anhydride copolymer of the type made by the general method set forth in U.S. Pat. 2,333,513, and characterized by a molecular weight of about 100,000. The bentonite employed was a Wyoming-type bentonite, primarily in the sodium form, obtained in commercial deposits near Belle Fourche, South Dakota. "Costs of Chemicals per Million Gallons of Sewage Treated," wherever presented in this disclosure is based on the approximate 1959 costs of materials, f.o.b. St. Paul, Minn., U.S.: $0.0125 per pound of Wyoming bentonite: $0.01 per pound of Mesabi iron ore; $0.05 per pound of technical-grade ferric chloride; $0.17 per pound of cationic corn starch; and $0.50 per pound of styrene-maleic anhydride copolymer. Only approximate costs are given, since the synergistic effects obtained by interaction of the components in our combinations frequently show a degree of effectiveness at least double—and sometimes ten times or more—that which might be reasonably expected on the basis of the performance of each of the separate ingredients of our combinations. Notice, for instance, in this "First Series," that very small amounts of our type of additive, used in accordance with our invention, effect clarification of sewage at a fraction (see Example 2) of the costs of conventional treatment.

FIRST SERIES
[Sanitary sewage]

| Example No. | Chemical treatment | | | Observed effects of chemical treatment | | | | | |
|---|---|---|---|---|---|---|---|---|---|
| | Amount of cationic clarifying material used | | Amount of negatively charged flocculating material added (p.p.m.) | After 7½ min. of settling | | After 15 min. of settling | | | Cost of chemicals per million gallons of sewage treated |
| | Cationic starch (p.p.m.) | Ferruginous material (p.p.m.) | | Settled solids (ml.) | Clarity index of supernatant fluid | Settled solids (ml.) | Clarity index of supernatant fluid | B.O.D. index | |
| 1 | | | | 4.0 | 112 | 6.0 | 122 | 100 | $0.00 |
| 2 | 0.6 | ¹3 | ²3 | 5.0 | 134 | 8.5 | 138 | | $2.01 |
| 3 | 1.8 | ¹9 | ²9 | 14.0 | 136 | 13.0 | 140 | | $6.05 |
| 4 | 3.0 | ¹15 | ²15 | 31.0 | 149 | 33.0 | 149 | 269 | $10.05 |

¹ 40/60 iron ore/FeCl₃. ² 2,000/1 Bent./org. polymer.

In the case of preferred embodiments of our invention (such as given in Examples 2 to 4 inclusive), the flocs formed on treatment of sanitary sewage are coarse and tough; there is some breaking up of the floc on vigorous stirring, but the floc reforms almost immediately on cessation of agitation, and settles rapidly and well, usually compressing in the sludge form over a period of time. When the sewage composition formed by adding cationic polymer of the type described herein and magnetite iron ore having a particle size smaller than 50 mesh (U.S. Standard Screens) is subjected briefly to a strong magnetic field, the flocs appear to form far more rapidly, and are coarse and tough, even if the magnetic field is not employed to effect rapid separation of the solids from the aqueous portion.

In the "SECOND SERIES" of examples, tests were conducted according to methods generally similar to those employed in conducting the tests set forth in the "FIRST SERIES" above, except insofar as an industrial (packinghouse) waste, containing only a minor component of sanitary (domestic) sewage, obtained in a small city in the north central part of the United States, was employed as the aqueous liquor to be treated. However, there was used in Example 6, as negatively charged flocculating material, phosphorylated corn starch prepared according to a method adapted from Samec, "Kolloidchemie der Starke," Steinkopff, Leipzig (1927): 3 grams of corn starch was dispersed in 20 grams of pyridine, and 2.8 grams of phosphorus oxychloride added cautiously and with vigorous stirring. This mass was heated on a hot water bath at 90° C. for 60 minutes with agitation, and the pyridine removed by further heating under vacuum.

SECOND SERIES
[Industrial Waste]

| Example No. | Chemical treatment | | | Observed effects of chemical treatment after 10 min. of settling | | Cost of chemicals per million gallons of sewage treated |
|---|---|---|---|---|---|---|
| | Amount of cationic clarifying material added | | Amount of negatively charged flocculating material added (p.p.m.) | Settled solids (ml.) | Clarity index of supernatant fluid | |
| | Cationic starch (p.p.m.) | Ferruginous material (p.p.m.) | | | | |
| 5 | | | | 2.2 | 110 | $0.00 |
| 6 | 3.6 | ¹6 | ²6 | 33.0 | 140 | $12.00 (estimated) |

¹ 40/60 iron ore/FeCl₃.
² Phosphorylated corn starch.

EXAMPLE 7

After the experiment set forth in Example 6 had been conducted in an Imhoff cone, it was run on a somewhat larger scale, in a 5-gallon jar, with the bubbling of air from the bottom of the jar, up through the sewage containing suspended and/or dissolved organic solids, including the nitrogen-containing cationic starch and the phosphorus-containing phosphorylated starch. Bubbling air through the flocculated mass did not break up the floc seriously, and after the air agitation (aeration/activation) had been stopped, sedimentation was extremely rapid and entirely satisfactory. Results obtained appeared to be generally parallel to those obtained in Example 6. However, there is some evidence that in this type of aeration/activation process, the flocculating agents of our invention actually enhance—perhaps by catalytic and/or nutrient roles—the biological reactions taking place.

It should be emphasized that a preferred embodiment of our invention, as set forth herein, involves the use of cationic polymers (that is, polymers bearing overall positive charges on the main bodies of the polymer molecules at pH levels commonly encountered in sewage, even if the polymer molecules be polyampholytic in the sense that they contain both groups that may ionize to produce free hydroxyl ions, such as the amine groups in cationic starch or the amide groups in certain modified polyacrylamides, and also groups that may ionize to produce hydronium ions, such as the hydroxy groups of cationic starch or the carboxy groups of certain modified polyacrylamides) and weighting agents in the treatment of sewage, although we have found that some degree of clarification of sewage-type liquors is possible with anionic polymers (bearing an overall negative charge on the main bodies of the polymer molecules at pH levels commonly encountered in sewage) and weighting agents. Such a degree in some cases may provide the basis for an economically feasible method of clarification, particularly if (as suggested above) the anionic polymer is resistant to degradation by heat, oxidation, hydrolysis, bacterial attack, or such like and the anionic polymer/weighting agent combination (optionally) along with inorganic anionic flocculating material (such as bentonite) is employed in some processes such as (1) treating of the sewage-type aqueous liquor with the anionic polymer/weighting agent combination, (2) settling the flocculated solids containing most of the sewage solids, the anionic polymer, and the weighting agent, (3) degrading the sewage solids, but not the anionic polymer or the weighting agent (to any really significant extent), by hydrolysis, oxidation, heat, bacterial attack or such like, in a vessel (preferably separate from the settling/sedimentation vessel), and (4) recycling the undegraded polymer and weighting agent from the degradation vessel (if such is used) along with make-up chemicals back into the main settling-sedimentation vessel. The anionic polymers of utility in this type of process are generally acidic, containing carboxylic, sulfonic, phosphorus-containing acidic, or other acidic groups, or some combination of these classes of acidic groups, have molecular weights preferably in excess of 10,000, are substantially linear, preferably hydrophilic, water-dispersible, and contain at least one acid group per 10,000 units of molecular weight.

EXAMPLE 8

Reagent "H" was prepared by adding 2 grams of activated carbon having an average particle size smaller than 200 mesh (U.S. Standard Screens) to 100 grams of a mixture obtained by admixing 2 grams of magnetite (iron ore) having an average particle size of about 80 mesh (U.S. Standard Screens) and 100 grams of a dispersion obtained by mixing 3 grams of a predominantly sodium-base montmorillonite clay of the type commonly known as Wyoming-type bentonite and being a so-called "high-yield" material recovered from the Belle Fourche (S. Dak.) deposit of such clay, 100 grams of water, and 15 grams of an aqueous dispersion containing 1 percent by weight of the sodium salt of a copolymer of styrene and maleic anhydride formed by reaction of equimolar amounts of styrene and maleic anhydride under conditions generally similar to those described in U.S. Pat. No. 2,333,513. 1 gram of Reagent "H" so prepared was dispersed in 1000 grams of raw water from a shallow well only 92 feet deep, situated in a relatively heavily populated part of Ramsey County, Minn., wherein the only currently available method of disposal of sanitary sewage involved, at the time of this experiment, the use of septic tank and cesspool systems, drain fields, and similar expedients, all of which tend to lead to some degree of contamination of underlying water-bearing strata. After 1 hour of standing, the supernatant liquor of the treated water ("sewage") was observed visually to have appreciably better clarity than untreated raw water, but it was apparent that this system of treatment did not approach in efficiency the effectiveness of our cationic polymer/weighting agent systems.

It has been noted above that certain metals or metal compounds, added to or placed in contact with sewage, may act as oxidation catalysts for the solids therein. Such catalysts have proved to be especially effective for the degradation of sewage solids by aeration, in the practice of our invention, although it should be realized that metals and metal compounds generally are regarded as undesirable in the aeration of sewage or such like. (See "Betz Handbook of Industrial Water Conditioning," third edition, W. H. & L. D. Betz, Philadelphia 24, Pa., 1950, pages 1 to 6 inclusive; O'Neill, Inst. Sewage Purif. J. Proc. 1957, Pt. 2, 150–2, as abstracted in Chemical Abstracts, 53, 22639g (1959).) It should be noted also that, of the many metals and metal compounds listed as having some utility as catalysts in the treatment of sewage or such like, certain ones are essentially ineffective except on very specific types of sewage solids under very specific conditions, while others of the metals or metal compounds listed have fairly broad utility as catalysts for the oxidation of solids in, for example, sanitary sewages. We have found copper materials (e.g., soluble copper salts) especially useful as catalysts in the oxidation of municipal sewage: copper materials are effective at very low concentrations, are inherently cheap, and can be removed from the treated sewage (if necessary) by adsorption on regenerable ion exchanger (see Kunin and Barry, Industrial and Engineering Chemistry, 41, 1269 (1949) and Kunin and Myers, "Ion Exchange Resins," John Wiley & Sons, Inc., New York, 1950, especially pages 26–37, 128 and 135) or on a disposable ion exchanger such as montmorillonite (see Rolfe, Miller, and McQueen, "Dispersion Characteristics of Montmorillonite, Kaolinite, and Illite Clays in Waters of Varying Quality, and Their Control with Phosphate Dispersants," Geological Survey Professional Paper, 334–G, U.S. Department of the Interior, Superintendent of Documents, Washington, 1960, especially pages 233–4), by precipitation, or otherwise. Alternatively, of course, the aeration may be performed on (optionally, porous) beds of particles comprising copper materials, across copper-bearing screens, or such like. Our catalytic method of oxidation is of great interest, of course, in improving the efficiency of such sewage-treating methods as the Zimmermann process (Bogan, Proc. Am. Soc. Civil Engrs. 85, No. SA4, 13–23 (1959)); actually, our oxidation catalysts can perform well in the heat/pressure oxidation step of a properly modified Zimmermann process.

EXAMPLE 9

In this experiment, compounds of various metals were added to 1000-milliliter samples of raw sewage in quantities indicated in the table below. The samples were aerated for ten minutes by bubbling air through a fritted glass funnel one and one-half inches in diameter from the bottom of the sewage, up through the sewage, while said sewage was contained in a standard Imhoff cone of 1000-milliliter capacity. Then 3 parts of Additive "Q" per million parts of sewage was added to each of the aerated sewage compositions, said Additive "Q" having been dispersed in water, at a solids concentration of 3 percent by weight, approximately 30 minutes prior to addition to the sewage, said Additive "Q" consisting of cationic starch, of the type employed in Example 2 above, Mesabi hematite (80 mesh, U.S. Standard Screens), and anhydrous ferric chloride, in a cationic starch:hematite:ferric chloride ratio of 1:2:3. Each sewage composition was stirred for a few seconds, and 3 parts of Additive "R" per million parts of sewage added to each of the sewage compositions, said Additive "R" having been dispersed in water, at a solids concentration of 3 percent by weight, approximately 30 minutes prior to addition to the sewage, said Additive "R" consisting of Belle Fourche bentonite, of the type employed in Example 2 above, and styrene-maleic anhydride copolymer, of the type employed in Example 2 above in a bentonite:copolymer ratio of 2000:1. The sewage composition was again stirred for a few seconds, and then again aerated for ten minutes by the same method as before. The samples were finally allowed to settle for 15 minutes. A 200 cc. aliquot was removed from the top of each sample and tested for dissolved oxygen by the "Dissolved Oxygen Test," as set forth in "Standard Methods for the Examination of Water, Sewage, and Industrial Wastes," the standard reference already mentioned previously herein. A standard Biochemical Oxygen Demand test was also performed on the samples with the best dissolved oxygen results and on a sample of raw sewage to which no catalyst (metal material) had been added.

| Sample No. | Reagent | Concentration of reagent solids (p.p.m.) | Dissolved oxygen content immediately after 2nd aeration (p.p.m.) | Biochemical oxygen demand 5-day (p.p.m.) |
|---|---|---|---|---|
| I | Zinc Sulfate | 2.0 | 4.15 | 1,385 |
| II | Manganese sulfate | 2.0 | 0 | |
| III | Chromite | 2.0 | 0 | |
| IV | Copper acetate | 2.0 | 5.1 | 1,205 |
| V | Manganese ore | 2.0 | 0 | |
| VI | Manganous oxide | 2.0 | 0 | |
| VII | Nickel acetate | 0.3 | 0 | |
| VIII | Ammonium molybdate | 0.3 | 0 | |
| IX | Silver nitrate | 0.3 | 0 | |
| X | Zirconium sulfate | 2.0 | 0 | |
| XI | Cobalt sulfate | 0.3 | 2.5 | 1,090 |
| XII | Polymerized ethylene imine | 2.0 | 0 | |
| XIII | Ilmenite composition | 2.0 | 1.0 | |
| XIV | Raw sewage—no aeration | 0 | 0 | 1,175 |

In the table above, Reagent I denotes a commercial grade of $ZnSO_4 \cdot H_2O$; Reagent II a crude commercial grade of manganese sulfate containing about 65 percent by weight of manganese sulfate, 10 percent by weight of ferrous sulfate, 7 percent by weight of silica, and minor amounts of oxides, sulfates, and phosphates of other elements; Reagent III an air-floated chromite having an average particle size such that 95 percent passed a 325-mesh U.S. Standard Screen, and having a chromium oxide content of about 44 percent by weight, an iron oxide content of about 25 percent by weight, a magnesium oxide content of about 10 percent by weight, a silica content of about 10 percent, the remainder being oxides, silicates, and the like of various other elements, especially aluminum and titanium; Reagent IV an essentially chemically pure grade of copper acetate; Reagent V a crude manganese oxide/silicate ore having a manganese content of about 41 percent, an iron content of about 5 percent, and a particle size of about 100-mesh (U.S. Standard Screens); Reagent VI a crude grade of manganese dioxide having a manganese content of about 48 percent and an average particle size of about 100-mesh (U.S. Standard Screens); Reagent VII a substantially pure grade of nickel acetate; Reagent VIII an essentially pure grade of

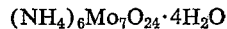

$$(NH_4)_6Mo_7O_{24} \cdot 4H_2O$$

Reagent IX an essentially pure form of silver nitrate; Reagent X a commercial grade of $Zr(SO_4)_2 \cdot 4H_2O$; Reagent XI a commercial grade of cobalt sulfate having a cobalt content of about 21 percent by weight; Reagent XII (not a metal compound or metal, but included in this example merely for purposes of comparison) a substantially linear polymer of ethylene imine having an average molecular weight of about 40,000; Reagent XIII an ilmenite composition formed by wetting, with four drops of concentrated sulfuric acid (98 percent), 3 grams of Virginia ilmenite having a titanium dioxide content of about 53 percent by weight (with the remainder being largely iron oxides and silicates) and an average particle size of about 50-mesh (U.S. Standard Screens), permitting the $H_2SO_4$-wetted ilmenite to stand at 70° F. for 4 minutes, and then adding 100 milliliters of water.

As the table above shows, chemically, the catalytic reaction provides a remarkable increase in the dissolved oxygen. Visual observation indicated, however, that the effect of the weighting agent was largely nullified in this example by the aeration after flocculation. Flocculated sewage particles were readily observable in samples taken for a five-day B.O.D. determination; that is, aeration after flocculation tended to make at least some of the flocculated solids to float, and in any commercial practice of this technique (as where substantially insoluble oxidation catalysts were included in the flocculating chemicals), it would be desirable to remove the flocculated solids both by skimming off the top and by draining off the sediment, while clarified water could be removed at some mid-point (vertically) between the floating solids and the settled solids. Of course, soluble oxidation catalysts could be included in the flocculating chemicals, and the aeration delayed until after the flocculation and settling steps.

EXAMPLE 10

12 liters of municipal sewage—designated herein as 38-A-RAW SEWAGE—having a high content of industrial packing-house wastes, from a small city in the north central part of the United States was treated with 4.5 parts of Reagent "Q" (see Example 9) solids per million parts of sewage, stirred for a few seconds, and then treated with 4.5 parts of Reagent "R" (see Example 9) solids per million parts of sewage, followed again by stirring, the whole "Q"—"R" treatment in this experiment being conducted under the same general conditions and in a manner parallel to the conditions and manner for the "Q"—"R" treatment of Example 9, except that the vessel employed in this case was a conventional 6-gallon polyethylene waste basket about eighteen inches high. The treated sewage composition (without any aeration of any kind up to this point) was then allowed to settle for 40 minutes, and 8500 cc. of supernatant—designated herein as "38-B-Supernatant From Flocculation"—was siphoned off. 4000 cc. of 38-B-Supernatant From Flocculation was poured into a vertical cylindrical tube about 3 inches in diameter by five feet high, and compressed air (as tiny bubbles) passed through the sewage in this tube from the bottom of the tube, through a fritted glass funnel about 1½ inches in diameter, for 2½ hours. The treated liquor obtained from this aeration was designated as "38-C-Treated Liquor From Flocculation and Uncatalyzed Aeration."

Another sample of 4000 cc. of 38-B-Supernatant From Flocculation was poured into a vertical cylindrical tube about 3 inches in diameter by five feet high, and 2 parts of copper acetate per million parts of 38-B-liquor was added, with thorough mixing. Next compressed air (as tiny bubbles) was passed through the sewage in this tube, from the bottom of the tube, through a fritted glass funnel about 1½ inches in diameter, for 2½ hours. The treated liquor obtained from this aeration was designated as "38-D-Treated Liquor From Flocculation and Catalyzed Aeration."

The characteristics of 38-A, 38-B, 38-C, and 38-D are compared in the following table, in which B.O.D. values are set forth, as obtained in the standard 5-day test of biochemical oxygen demand employed by sewage technicians generally.

| Sample | Appearance | Biochemical oxygen demand P.p.m. | Percent removal |
|---|---|---|---|
| 38-A | Dark, dirty gray | 1,055 | |
| 38-B | Turbid gray | 525 | 50.2 |
| 38-C | Turbid gray | 440 | 58.3 |
| 38-D | Sparklingly clear; water-white | 265 | 74.9 |

In a separate, parallel experiment, a sample of sewage was treated in exactly the same manner as that set forth in 38-D above, except that the catalytic oxidation was carried out in a pressure vessel at a temperature in the range of 212° to 400° F. Oxidation and clarification was complete in this instance in a small fraction of the time required to produce oxidation in the case of 38-D above.

The practice of our invention, as set forth herein, is thus seen to have provided a remarkable increase in the efficiency of sewage treatment, and especially the aeration process. The final effluent obtained in the treatment of the same sewage through a complete secondary biological treating plant averaged a B.O.D. removal of 70.2 percent for the same day on which the above experiments were run. It is seen, therefore, that the process of this invention, using our novel flocculating chemical compositions, followed by properly catalyzed post-aeration of the supernatant, provides a degree of treatment superior to that attained from an operating secondary biological sewage treatment plant.

The literature is replete with references relative to aeration in sewage treatment processes. In the activated sludge processes, the sludge is aerated, and part of it is returned to the primary phase of the treatment process, in part as a method of preventing septicity of the sludge. Pre-aeration of sewage before primary sedimentation is practiced in many operating plants. Pre-aeration and primary sedimentation of sanitary sewage generally produces a reduction of B.O.D. in the range of 45 percent. A small packaged sewage plant provides oxidation and digestion in one unit with extended aeration of the sludge. However, no attempt is made in such plants to remove either dissolved or suspended solids as such. The Guggenheim process consists of the aeration of chemically flocculated sewage followed by sedimentation with the return of the sludge to the aeration tank.

To the best of our knowledge, however, the standard literature of the sewage disposal field makes no reference to a process wherein a supernatant of a chemically flocculated sewage, either with or without the addition of a catalyst, is post-aerated in the manner set forth above.

EXAMPLE 11

In this experiment, seven reagents were employed in a comparison of their flocculating efficiencies for treating a municipal sewage containing high concentrations of industrial (packing-house) wastes from a small city in the north central part of the United States. In each case, 3 parts of reagent solids per million parts of sewage treated was added to 1000 milliliters of sewage in a 1000 cc. Imhoff cone, said reagent solids having been dispersed at a 3 percent solids concentration in water thirty minutes prior to use. After addition of the reagent slurry, the sewage composition was stirred with a glass rod for a few seconds, and then allowed to settle for 15 minutes.

In the case of Reagent 39-A, however, the reagent was added to the sewage, the sewage composition stirred for a few seconds with a glass rod, and then 3 parts of Reagent 39-B solids per million parts of sewage was added, followed by stirring. Reagent 39-A was far more efficient than any of the other reagents tested (at equal concentrations), even if used by itself, and not in association with Reagent 39-B. The efficacy of Reagent 39-A dropped most dramatically and drastically when hematite was omitted from its formulation. (Reagent "Q" contained 80 mesh hematite.)

Reagent 39-A was identical to Reagent "Q" described in Example 9.

Reagent 39-B was identical to Reagent "R" described in Example 9. Reagent 39-C was a mixture of commercial modified polyacrylamide polymer having a substantial content of carboxylic groups (Chemical Week, Sept. 17, 1960, page 6), pre-dispersed in water over a period of several months at a content of 0.05 percent solids, and magnetite iron ore from the Mesabi range of Minnesota having an average particle size of about 325 mesh (U.S. Standard Screens), the polymer:magnetite ratio of the mixture being 1:2500.

Reagent 39-D was a mixture of a crude substantially linear polyglycolamine having an estimated molecular weight of about 1000 and regarded as a by-product from the standard commercial process for making alkanolamines from cylic oxides (such as ethylene oxide) and ammonia, and Mesabi magnetite having an average particle size of about 325 mesh (U.S. Standard Screens), the polyglycolamine:magnetite ratio being 1:5.

Reagent 39-E was substantially identical to Reagent "Q" of Example 8, except that a commercial grade of so-called "cationic cellulose" substantially equivalent, for the purposes of this experiment, to the "diethylaminohydroxypropylcellulose" described by Gilles Montegudet (Peintures, pigments, vernis 34, 204–13, 311–19 (1958)) was substituted for cationic starch in the formulation.

Reagent 39-F was a mixture of commercial grade of sodium alginate, characterized by a molecular weight such that 1 percent solids dispersion of said sodium alginate in water showed a viscosity of 500 centipoises, and finely ground commercial barium sulfate (barite) ore, the alginate:barite ratio of the mixture being 1:5 (See Ravnestad, U.S. Pat. 1,619,036, issued Mar. 1, 1927.)

Reagent 39-G was a mixture of substantially linear polymerized ethylene imine having a molecular weight of about 40,000, and Mesabi magnetite having an average particle size of about 325 mesh (U.S. Standard Screens), the polymer:magnetite ratio of said mixture being 1:5.

| Reagent employed | Volume of settled solids after 15 minutes (cc.) | Comments |
| --- | --- | --- |
| 39-A, 39-B | 31.0 | Extremely heavy floc; settled rapidly. |
| 39-C | 1.5 | Poor floc; slow settling. |
| 39-D | 2.0 | Do. |
| 39-E | | Fair floc; gradual settling. |
| 39-F | 2.5 | Poor floc; slow settling. |
| 39-G | | Fair floc; gradual settling. |
| None | 4.0 | (Raw sewage—standard). |

EXAMPLE 12

In this experiment, the whole sewage volume of a small industrial city in the north central part of the United States was treated with compositions of our invention and according to methods of our invention, over a period of almost nine hours. During this period, flow averaged almost 700,000 gallons per hour, and total flow was over 6,000,000 gallons. In this plant, sewage is normally given a "primary" sedimentation treatment, followed by "intermediate" treatment in mechanical flocculating basins stirred slowly by moving paddles, and finished by treatment on biological filters and final clarification basins. Content of B.O.D. (biochemical oxygen demand) of the raw sewage influent during this test averaged 1375 parts per million.

At the primary stage, there was aded at a steady rate throughout a nine-hour working day through a chemical feeder, as an aqueous dispersion having a solids content of 4 percent, at a rate equivalent to about 25 pounds of solids per hour, an intimate mixture of the proportions: 3 parts anhydrous ferric chloride/2 parts Mesabi hematite of a particle size passing 48 mesh but retained on 60 mesh (U.S. Standard Screens)/1 part cationic starch of the type employed in Example 2 above. Through a second chemical feeder located a few feet downstream from the first feeder at the primary stage, there was added at a steady rate equivalent to about 25 pounds of solids per hour, an intimate mixture of the proportions: 2000 parts Belle Fourche (S. Dak.) bentonite/1 part sodium salt of a copolymer of styrene and maleic anhydride formed by reaction of equimolar amounts of styrene and maleic anhydride under conditions generally similar to those described in U.S. Pat. 2,333,513.

In the conventional mode of operation of this plant, expected B.O.D. removal at the intermediate stage averages about 22.4 percent; during the chemical treatment described above, B.O.D. removal at the intermediate stage was found to be 41.4 percent.

In the conventional mode of operation of this plant, expected B.O.D. removal at the final stage averages 63.8 percent; during the chemical treatment described above, B.O.D removal at the final stage was found to be 73.4 percent.

The results obtained in this full field-scale test are especially noteworthy since the particular sewage used in this case had a very high content of industrial (packing-house) wastes, and an average B.O.D. content about 400 percent greater than the average B.O.D. content of ordinary sanitary sewages. Again, the results are noteworthy for the extremely low costs involved; at 1959 costs (f.o.b. St. Paul, Minn.), the total cost of chemicals for this treatment was only about $5.90 per million gallons treated, a figure approximately the same as the cost of electricity to pump this same sewage through the various stages of the complete plant operation.

EXAMPLE 13

Samples of sanitary sewage from a village in the northern part of the United States were treated with Reagent "Q" (of Example 9), or Reagent "R" (of Example 9), or oxidation catalysts (selected from the oxidation catalysts listed herein), or some combination of these three classes of sewage-treating agents, according to the various economic procedures set forth in FIG. 1, employing (depending upon the sequence of sewage-treating operations selected in the individual case), various of the eqiupment designs set forth in the other figures of this specification. Removal of solids realized was generally in the range of 30 to 90 percent.

EXAMPLE 14

Sanitary sewage from a village having a population of approximately 5000 and located in the north central part of the United States was treated with 3 parts of Reagent "Q" (of Example 9) per million parts of sewage, next treated with 3 parts of Reagent "R" (of Example 9) per million parts of sewage, thoroughly mixed, and then split into two equal portions, "14–A" and "14–B." One portion, labeled "14–A," was passed through a "magnetic agglomerator" of the type shown in FIG. 2 and consisting of a polyethylene funnel approximately four inches long along the axis of the funnel, approximately one-half inch in diameter on the outlet end, and about three inches in diameter on the inlet end, having on its outside surface approximately 100 turns of #16 insulated bell wire energized with approximately 5 amperes of electrical current. After passage of the "14–A" portion through the "magnetic agglomerator," it was allowed to stand at rest side by side next to the other portion, "14–B." It was noted that after 15 minutes of standing, the volume of settled solids in the "14–A" portion was almost double the volume of settled solids in the "14–B" portion.

EXAMPLE 15

In this series of experiments, the efficacy of oxidation catalysts, especially soluble or insoluble copper and/or cobalt materials, was checked at elevated temperatures and superatmospheric pressures. 500 cc. of fresh dilute sewage was treated with copper oxidation catalyst at a concentration of 2 parts of copper sulfate per million parts of sewage. This mixture was then heated in a pressure reactor with externally supplied air for 1-minute, 2-minute, 5-minute, and 15-minute periods at temperatures in the range from 70 to 250° F. It was found that the rate of oxidation of the sewage is accelerated by heat and pressure, although it does not appear economic, in the operation of this embodiment of our invention, to exceed the published maximum recommended temperature and pressure limits recommended for conventional Zimmermann-process reactors—i.e., 1800 p.s.i.g. and 560° F. respectively. (See Chemical & Engineering News, p. 59, Oct. 23, 1961, and Chemical Week, p. 73, Oct. 28, 1961.)

EXAMPLE 16 (SEE FIGURE 17)

An iron wire 63 approximately one-eigth inch in diameter and one foot long was centered in a piece of iron pipe 64 approximately eleven inches long, and the annular space 65 between the inside of the pipe and the outside of the wire was filled with sanitary sewage treated with 1.8 parts of cationic starch, 9 parts of 40/60 mixture of iron ore and ferric chloride, and 9 parts of a 2000/1 mixture of bentonite and organic polymer, per million parts of sewage, all chemical reagents added being of types specified in Example 2 above, except that 325-mesh (U.S. Standard Screens) magnetite iron ore, rather than Mesabi hematite iron ore, was employed. Exit ports 66 approximately one-fourth inch in diameter were arranged (1) concentrically around the central wire, (2) ports 67 about halfway along the radius of the pipe, between the center of the pipe and the inside wall, and (3) ports 68 as close as possible to the inside wall of the pipe, in a general design modified somewhat from the dielectrophoretic precipitator cell disclosed by Pohl, Scientific American, 203, No. 6, page 110 (December 1960). A magnet having a field strength of approximately 5000 gauss was then applied to the device, with one pole on the central wire and one pole on the pipe, so that the pipe in effect became one pole of the magnet, and the central wire became the other. Under these circumstances, of course, sewage floc containing iron ore tended to migrate toward both the central wire and the outside pole, but became more concentrated near the wire because of the higher intensity of the magnetic field in that region. Interruption of the magnetic field followed by re-establishment of the field, done repeatedly, tended to cause the particles of floc containing iron ore to settle erratically down the outside of the central wire 63 and down the inside walls of the pipe 64, and it was found that "bridging" of particles across the annular space 65 between the wire and the pipe walls may be minimized by the following expedients: alternating the polarity—i.e., by making the wire the N pole and the pipe the S pole one instant, then making the wire S pole and the pipe the N pole the next, and so on repeatedly; by correctly balancing the rate of flow of sewage through the annular space versus the magnetic field strength available, and the distance between the wire and the pipe walls; and by other means. Floc/iron ore mixture may be drawn off the pipe walls by an annular collector at the bottom, but because floc (sludge) from the pipe wall is more dilute than floc collected from the central wire, the floc (sludge) from the inside pipe wall is preferably recycled into the top of the unit with influent sewage. Floc/iron ore collected off the central wire through the concentrically disposed outlet port in the middle of the bottom may be sent to a sludge thickening station and/or sludge disposal. Clear effluent is drawn off the (optionally, annular) port or ports located approximately midway between the central wire and the pipe walls, at the bottom of the unit. Flow in such a unit is from top to bottom, although in some circumstances a reverse direction of flow could have advantages, with ports suitable located at the top.

In this particular example, the magnetic field was established by a medium-strength permanent magnet 78, but electromagnetic means of establishing the magnetic field serve equally well, and in fact have definite advantages in designs in which rapid alternation of polarity between wire and pipe walls is desired (usually, to prevent "bridging").

EXAMPLE 17

In this example, exactly the same type of unit as employed in Example 16 was used in an effort to separate solids from sewage, except that an electric field, rather than a magnetic field, was established between the central wire and the outside pipe. Electric fields having potential gradients from 1 to 10,000 volts per inch, and of both alternating-current and direct-current type, were tested, but only poor separations and very poor efficiencies were obtained in dealing with aqueous wastes, even with electrically insulated wire and pipe.

EXAMPLE 18

A mixture of water containing various salts and approximately 5000 parts of phenol per million, and substantially equivalent to an oil refinery spent caustic stream that has been neutralized to about pH 5 to spring hydrogen sulfide as gas, next air-blown to oxidize mercaptans to disulfides, and then skimmed to remove an oily layer of phenols and disulfides, was treated with approximately 360 parts of cationic starch, 1800 parts of 40/60 mixture of iron ore and ferric chloride, and 1800 parts of a 2000/1 mixture of bentonite and organic polymer, per million parts of aqueous mixture treated, all chemical reagents added being of the types specified in Example 2 above. A purple-brown floc formed immediately, and was allowed to settle. Supernatant was drawn off, and additional chemicals added as before until a clear supernatant was obtained. This supernatant was oxidized by air blowing, and then final removal of the last traces of phenol effected by passage through a commercial strongly basic anion exchange resin, or charcoal 13.

Especially good results were obtained with aqueous mixture substantially equivalent to oil refinery effluent spent caustic which had not been neutralized prior to treatment but which merely had been air-blown at an elevated temperature and moderate pressure to convert sulfide content to thiosulfate.

EXAMPLE 19

This experiment was conducted in exactly the same fashion as Example 2, except that there was used instead of Mesabi hematite an equivalent amount of superparamagnetic iron oxide sol, the crystalline structure of the particles in the sol being assumed to be gamma-$Fe_2O_3$ (on the basis of preliminary X-ray diffraction and quantitative analysis data), having an average particle size in the range of 3 to 12 millimicrons in diameter. Flocculation and separation of solids were speeded up in this case by applying a 10,000-gauss magnetic field at the bottom of the container in which the flocculation of the sewage was conducted.

EXAMPLE 20

Example 20 was conducted in exactly the same fashion as Example 19, except that there was used instead of superparamagnetic iron oxide sol a so-called "magnetic" carbon black having an iron content of approximately 8 percent and a particle size in the range of 7 to 45 millimicrons in diameter (Chemical Week, page 37, Nov. 16, 1963). After flocculation of the sewage had been effected in this experiment, removal of solids from the sewage liquor was expedited by applying a permanent magnet with a magnetic field of approximately 10,000 gauss to the bottom of the flocculation chamber.

EXAMPLE 21

100 cc. of sewage sludge, obtained from the primary sedimentation tank of a small city in the northern part of the United States, was mixed with 0.1 gram of colloidal alumina, introduced into the mixture as a white free-flowing powder, consisting of clusters of minute fibrils of boehmite (AlOOH) alumina, having an AlOOH content of about 83.1 percent, an acetate content of 9.8 percent (as acetic acid), a sulfate content of 1.7 percent, a water content of 5.0 percent, and minor amounts of ammonium ion, iron, sodium, and silica, a specific surface area of approximately 274 square meters per gram, a pore volume of 0.53 cc./g., and an average pore diameter of 77 angstroms.

This sludge mixture was most thoroughly mixed with the colloidal alumina in a high-speed blender for 1 minute, allowed to settle for fifteen minutes, the supernatant liquor drawn off, and the remaining sludge dumped through a spout 73 onto a vacuum filter press (see FIG. 18) in which there were disposed bars 69 about two inches high, and about 6 inches apart, on a slowly moving belt 70, over the quadrant 71 of a cylindrical filter press to which vacuum was being applied. These bars served to keep the bulk 77 of the filter cake moving slowly over the vacuum quadrant, from one end to another, while just below these bars the filter cloth 72 was kept moving rapidly over the quadrant, so that the fast-moving belt moved continuously, for removal by a doctor blade 74 or equivalent means, where necessary, into a sludge removal trough 75, a very thin, compact, dense "skin" 76 of sludge solids, much denser than the rather loose sludge disposed above the level of the bottom of the two-inch bars.

EXAMPLE 22

Example 22 was run in exactly the same manner as Example 21, except that there was added to the sludge mixture, in addition to the colloidal alumina, an equal weight of polyethyleneimine having an average molecular weight of approximately 40,000.

EXAMPLE 23

Example 23 was run in exactly the same fashion as Example 22, except that there was added, in addition to the boehmite and polyethyleneimine, an equal amount of 325-mesh (U.S. Standard Screens) magnetite iron ore, and rapid separation was effected by applying a strong magnetic field on the side of the filter cloth opposite from that on which the treated sewage sludge was being dewatered.

EXAMPLE 24

Example 24 was conducted in exactly the same manner as Example 2, except that separation of solids was expedited by centrifugation at 600 r.p.m. in a centrifuge 18 inches in diameter.

EXAMPLE 25

Example 25 was conducted in exactly the same manner as Example 2, except that 325-mesh (U.S. Standard Screens) magnetite iron ore was used instead of Mesabi hematite, and separation of sewage solids from supernatant liquor was expedited by one, or some combination of the following means: (a) application of sonic and/or ultrasonic vibrations to the flocculation chamber, the sonic or ultrasonic vibration frequency or frequencies being selected so as to be at resonant or harmonic frequency or frequencies of the natural vibration frequency of the flocculation vessel at least a part of the time; (b) application of a magnetic field to at least part of the flocculation vessel; (c) centrifugation; (d) filtration of solids on a vacuum filter, optionally of special design generally as in Examples 21–23, and/or, in the case of certain very specialized industrial wastes, (e) application of a non-uniform electric field.

EXAMPLE 26

In this example, sewage was treated with oxidation catalyst in the manner set forth in Example 9, and soluble oxidation catalyst removed from the treated liquor, after settling, by passage through a strongly acidic-type commercial ion exchange resin bed 14. It is conventional practice, of course, to pass any liquor containing a substantial amount of suspended solids and intended to be treated on granualar ion exchange resins or such like through sand filter bed 12 or equivalent device, prior to processing on the ion exchange material. (In the treatment of slightly acidic sewages with copper oxidation catalyst, it is frequently possible to remove the copper from solution by passing it over scrap "tin cans," on which, of course, removal by immersion plating of the copper on the more anodic tin and/or steel occurs.)

EXAMPLE 27

A magnetic separator was constructed of epoxy resin and standard transformer sheet steel as follows: Nine sheets of standard transformer sheet steel, about 16 gauge silicon steel, 8 inches long by 2 inches wide, were stacked up parallel to each other, and spaced apart from each other by fiber bolts with polyethylene washers or spacers one-fourth inch thick, such that the plates were spaced one-quarter inch apart.

This assembly was then placed in a long narrow tank about 12 inches long by 2½ inches wide constructed of epoxy resin, with the plates standing up vertically in the tank, and so arranged that the plate assembly occupied the middle 8 inches of the tank length, with open volume of about 2 inches of length on either end. An inlet was arranged on one end of the tank, and an outlet near the top of the tank was arranged on the other end.

A coil of about 400 turns of insulated wire was wound around both the plate assembly and the tank, in a plane perpendicular to the length of the tank, and around the middle of the tank. Sewage treated as in Example 2 above, except that 325-mesh (U.S. Standard Screens) magnetite iron ore, rather than Mesabi hematite iron ore, was used in the chemical treatment, was then passed slowly through the tank, while direct current—7 amperes at 16 volts—was passed through the coil. Most of the floc formed in the inlet chamber was found to adhere to the metal plates on passage through the unit, and the plates could be easily cleaned later by simply disconnecting the current and washing the plates with water. Alternating current (110 volts) was also tested for energizing the coil, but the magnetic separator did not work at all as satisfactorily with alternating current as with direct current.

EXAMPLE 28

A small sample of sewage was split into two equal parts of 40 cc. each. One part was allowed to stand at 70° F. in a 5000-gauss magnetic field, and the other was allowed to stand at 70° F. in the same environment, but in the natural magnetic field of the earth only. After two days, decomposition of the sample in the 5000-gauss magnetic field had apparently progressed more rapidly than decomposition of the control sample, and over a period of one week of standing, it was clear that the 5000-gauss magnetic field was influencing the course of the decomposition appreciably.

EXAMPLE 29

Most of the insoluble solids content of a sample of sewage was allowed to settle out over a period of 4 hours, and approximately 10 parts of nutrient solution per million parts of sewage was added to the sewage sample, said nutrient being a mixture of approximately 1 part potassium nitrate, 2 parts diammonium phosphate, 2 parts monoammonium phosphate, 3 parts urea, 2 parts ammonium nitrate, and 100 parts water, adjusted to pH 7 with minimum amounts of caustic and phosphoric acid. The decomposition of this sewage sample appeared to be more rapid and complete than that of a control sample not treated with nutrients.

EXAMPLE 30

A sample of supernatant liquor obtained from the sewage treatment process set forth in Example 2 was placed in a concrete vessel 15, and a direct current of 16 volts passed between two parallel steel plates, approximately 4 inches square and 2 inches apart, immersed in said supernatant liquoir. It was found that after a brief treatment of this type, additional flocculation of solids had occurred, with migration of flocculated solids principally toward the positively charged electrode. It was also found that oxygen liberated at the anode tended to satisfy the oxygen demand of the liquor, while chlorine liberated at the anode (presumably by discharge of chloride ions in the sewage) served to sterilize the liquor.

We claim:

1. A system for magnetically densifying solids contained in sewage and separating the densified solids and the clarified effluent comprising:
means to introduce an organic coagulating material, which organic coagulating material is a water-dispersible synthetic organic cationic polyelectrolytic flocculating material having a molecular weight in excess of 10,000 and at least one amine group per 10,000 units of molecular weight, and a magnetically-susceptible weighting agent into the sewage;
means to disperse the coagulating material and the weighting agent in the sewage;
means for magnetically densifying coagulated solids, which densification means comprises:
a magnetically-susceptible conduit for the passage of sewage mixed with the coagulating material and the weighing agent, and
means for establishing a radially nonuniform magnetic field within the conduit that is most intense along the axis of the conduit including a magnetically-susceptible member extending along the axis of the conduit whereby magnetic poles of opposite polarity are established along the axis and the side walls of the conduit; and
first densified solids discharge means located immediately surrounding the axis of the conduit;
second densified solids discharge means located adjacent the side walls of the conduit; and
clarified effluent discharge means located in an annular region intermediate the first and second solids discharge means.

2. A system according to claim 1 wherein means are provided to collect the material discharged from the second solids discharge means and recycle, at least in part, the material discharged from the second solids discharge means back through the conduit.

3. A method for magnetically densifying solids contained in sewage and separating the densified solids from the clarified effluent comprising the steps of:
treating sewage with an organic coagulating material and a magnetically-susceptible weighting agent;
causing the treated sewage to pass through a conduit;
subjecting the treated sewage while passing through the conduit to the influence of a nonuniform magnetic field that is most intense along the axis of the conduit;
discharging densified solids through a first discharge means adjacent the axis of the conduit;
discharging densified coagulated solids through a second discharge means adjacent the side walls of the conduit; and
discharging clarified effluent through a third discharge means located in an annular region intermediate the first and second discharge means.

4. A method according to claim 3 including the step of recycling at least a portion of the material discharged through the second discharge means back through the conduit.

5. A system for magnetically densifying solids contained in sewage and separating the densified solids from the clarified effluent comprising:
means to introduce an organic coagulating material, which organic coagulating material is a water-dispersible synthetic organic cationic polyelectrolytic flocculating material having a molecular weight in excess of 10,000 and at least one amine group per 10,000 units of molecular weight, and a magnetically-susceptible weighting agent into the sewage;
means to disperse the coagulating material and the weighting agent in the sewage;
means for magnetically densifying coagulated solids, which means include:
first conduit means comprised of nonmagnetic materials, and
means for imposing a uniform, axially-oriented magnetic field adjacent the exterior of the first conduit;
second conduit means radially within the first conduit and spaced to define a clarified effluent discharge means between the inside walls of the first conduit and the outside walls of the second conduit, and a densified coagulated solids discharge means within the second conduit adjacent the axis of the first conduit.

6. A system according to claim 5 wherein the means for imposing the magnetic field includes a plurality of turns of conductive wire wrapped around the first conduit and means to cause a nonpulsating direct electric current to flow through the conductive wire.

7. A system according to claim 6 wherein the first conduit means includes a venturi section and the inlet to the second conduit means is positioned downstream from the exit end of the venturi.

8. A system according to claim 6 wherein means are provided to subject the mixture of sewage, organic coagulating material and magnetically-susceptible weighting agent to a second magnetic field that passes across the direction of flow of the mixture passing through the first conduit prior to the time that the axially-oriented magnetic field is imposed.

References Cited

UNITED STATES PATENTS

| | | | |
|---|---|---|---|
| 2,232,294 | 2/1941 | Urbain et al. | 210—42 X |
| 2,398,725 | 4/1946 | Schutte | 210—223 X |
| 2,849,312 | 8/1958 | Peterman | 210—222 X |
| 3,279,602 | 10/1966 | Kottenstette et al. | 210—222 X |

J. L. DeCESARE, Primary Examiner

U.S. Cl. X.R.

210—222